United States Patent
Hershman

(10) Patent No.: US 9,239,655 B2
(45) Date of Patent: Jan. 19, 2016

(54) PARSIMONIOUS SYSTEMS FOR TOUCH DETECTION AND CAPACITIVE TOUCH METHODS USEFUL IN CONJUNCTION THEREWITH

(71) Applicant: Nuvoton Technology Corporation, Hsinchu (TW)

(72) Inventor: Ziv Hershman, Givat Shmuel (IL)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 343 days.

(21) Appl. No.: 13/855,911

(22) Filed: Apr. 3, 2013

(65) Prior Publication Data

US 2013/0300707 A1  Nov. 14, 2013

Related U.S. Application Data

(60) Provisional application No. 61/645,349, filed on May 10, 2012.

(51) Int. Cl.
*G09G 5/00* (2006.01)
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC .................... G06F 3/044; G06F 3/045; G06F 2203/04111; G06F 2203/04112; G06F 2203/04113; G06F 3/0416
USPC ................. 345/173, 174; 178/18.06
See application file for complete search history.

(56) References Cited

U.S. PATENT DOCUMENTS

| | | |
|---|---|---|
| 5,825,352 A | 10/1998 | Bisset et al. |
| 6,188,391 B1 | 2/2001 | Seely et al. |
| 6,297,811 B1 | 10/2001 | Kent et al. |
| 7,129,935 B2 | 10/2006 | Mackey |
| 7,218,124 B1 | 5/2007 | Mackey et al. |
| 7,292,859 B2 | 11/2007 | Park |

(Continued)

FOREIGN PATENT DOCUMENTS

| | | |
|---|---|---|
| WO | 2008108514 A1 | 9/2008 |
| WO | 2010079393 A1 | 7/2010 |

OTHER PUBLICATIONS

R. Seguine, et al., "Capacitive sensing techniques and considerations—The basics" http://www.eetimes.com/General/PrintView/4016274, pp. 1-6 (2007).

(Continued)

*Primary Examiner* — Jennifer Nguyen
(74) *Attorney, Agent, or Firm* — Browdy and Neimark, PLLC

(57) ABSTRACT

A touch sensing system comprising a set of touch surfaces in a touch panel including a population of touch surfaces; and at least one touch alert generator separately alerting for touch on each of, and both of, at least first and second touch surfaces from among the population of touch surfaces, wherein the alert generator is operative to determine capacitance of said first touch surface, determine touch object capacitance of said first and second touch surfaces, and compute a difference between the two capacitances, thereby to generate an approximation for touch object capacitance of said second touch surface.

26 Claims, 21 Drawing Sheets

(56) References Cited

U.S. PATENT DOCUMENTS

| | | |
|---|---|---|
| 7,797,115 B2 | 9/2010 | Tasher et al. |
| 2005/0270039 A1 | 12/2005 | Mackey |
| 2008/0074398 A1 | 3/2008 | Wright |
| 2008/0158198 A1* | 7/2008 | Elias ............................. 345/174 |
| 2010/0149108 A1 | 6/2010 | Hotelling et al. |
| 2011/0017523 A1 | 1/2011 | Bulea et al. |
| 2011/0062969 A1 | 3/2011 | Hargreaves et al. |
| 2011/0062971 A1 | 3/2011 | Badaye |
| 2011/0216038 A1 | 9/2011 | Stolov et al. |
| 2012/0127111 A1* | 5/2012 | Edwards ....................... 345/174 |
| 2012/0262419 A1 | 10/2012 | Hershman et al. |

OTHER PUBLICATIONS

Wikipedia article, "Capacitive Sensing" http:// en. wikipedia.org/w /index. php ?title=Capaciti ve _ sensing&o ldid=4 91422295, pp. 1-5 (2012).

\* cited by examiner

|  | ΔT [uS] | | ΔC' [pF] | |
|---|---|---|---|---|
|  | of M1 | of M2 | $\Delta C_{M1}$ | $\Delta C_{M2}$ |
| No touch | 1.22 | 80 |  |  |
| ΔC touch on C1 | 1.45 | 88 | 2.3 | 2 |
| ΔC touch on C2 | 1.23 | 88 | 0.1 | 2 |
| ΔC touch on C1 and C2 | 1.46 | 96 | 2.4 | 4 |

| | ΔT [uS] | | ΔC' [pF] | |
|---|---|---|---|---|
| | of M1 | of M2 | $\Delta C_{M1}$ | $\Delta C_{M2}$ |
| No touch | 3.36 | 79.99 | | |
| ΔC touch on C1 | 3.57 | 84.00 | 2.1 | 2.005 |
| ΔC touch on C2 | 3.38 | 84.00 | 0.2 | 2.005 |
| ΔC touch on C1 and C2 | 3.59 | 88.00 | 2.3 | 4.005 |

| Attribute \ Fig. | 4a | 4b | 4c | 4d | 4e | 4f |
|---|---|---|---|---|---|---|
| Number of touch surfaces per touch sensor | 2 | 3 | 2 | 3 | 2 | 3 |
| Number of touch surfaces per column in the depicted example | 6 | 6 | 6 | 9 | 6 | 9 |
| Similar distance between connected touch surface couples (e.g. C1 and C2) | Yes | Yes | Yes | Yes | No | No |
| All touch surfaces of each touch sensor are at the same column | No | No | Yes | Yes | Yes | Yes |
| Traces pass between touch surfaces of the same column | No | No | Yes | Yes | No | No |

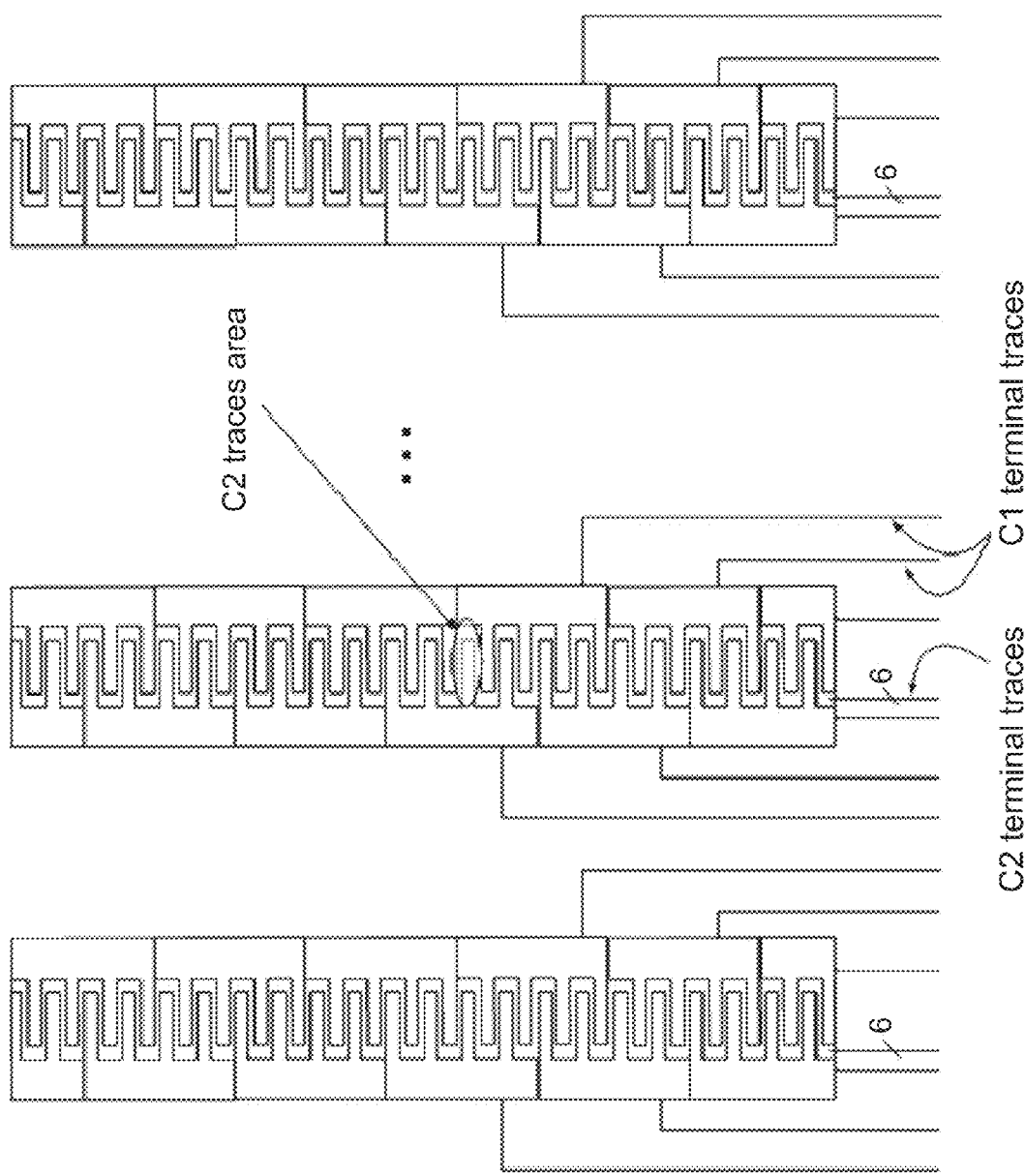

PARSIMONIOUS SYSTEMS FOR TOUCH DETECTION AND CAPACITIVE TOUCH METHODS USEFUL IN CONJUNCTION THEREWITH

REFERENCE TO CO-PENDING APPLICATIONS

Priority is claimed from U.S. Provisional Patent Application No. 61/645,349, entitled "Systems and methods for capacitive touch detection" and filed 10 May 2012.

FIELD OF THE DISCLOSURE

The present invention relates to capacitive sensing.

BACKGROUND OF THE DISCLOSURE

According to Wikipedia, capacitive sensing is a technology for detecting proximity, position, etc., based on capacitive coupling effects.

U.S. Pat. No. 7,797,115 to Tasher et al is entitled "Time interval measurement for capacitive detection".

Publication US 20110216038 of U.S. Ser. No. 13/042,965 is entitled "Systems and methods for using capacitive surface for detecting multiple touch points". Publication US 20120262419 al of U.S. Ser. No. 13/533,618, also termed herein the "single layer patent document" and similar, is entitled "Systems and methods for detecting multiple touch points in surface-capacitance type touch panels".

"Capacitive sensing techniques and considerations—The basics" by Ryan Seguine, Cypress Semiconductor, available on Internet at the following http www link: eetimes.com/design/automotive-design/4016274/Capacitive-sensing-techniques-and-considerations-The-basics states that "Charge Transfer, Successive Approximation, Sigma-Delta, and Mutual Capacitance Measurement are . . . commonly used (capacitance) sensing methods." Charge transfer may be considered a general method of which Sigma-delta and the Successive-approximation are instances. The Charge transfer method may also be referred to as a switched capacitors method.

The disclosures of all publications and patent documents mentioned in the specification, and of the publications and patent documents cited therein directly or indirectly, are hereby incorporated by reference. Materiality of such publications and patent documents to patentability is not conceded

SUMMARY OF CERTAIN EMBODIMENTS

The following terms and symbols may be construed either in accordance with any definition thereof appearing in the prior art literature or in accordance with the specification, or as follows:

Button—a portion of a touch screen regarding which an application running on the touch screen needs to know whether or not this touch screen portion was touched but not where it was touched. Typically, the buttons are marked on the screen for the benefit of the user.

In touch screen applications which do not include buttons, the application running on the touch screen typically needs to know where exactly the touch screen was touched, as accurately as the touch screen resolution allows.

Touch panel—touch pad or track pad or touchscreen including a multiplicity of electrically conductive shapes typically covering a plane defined by the pad or screen.

Touch surface—an electrically conductive shape which changes its capacitance in the presence of a touch object. May be used as a capacitive touch button. A multiplicity of such may comprise a capacitive slider, roller touch panel and the like. It is appreciated that any suitable geometrical shape may be employed.

Pitch—the distance between a pre-defined starting-point of one element to the corresponding pre-defined starting-point of the next Touch Alert Generator—Any apparatus or system which alerts for touch of touch surface/s.

Touch sensor—unit e.g. sampling logic that measures capacitance of one or more touch surfaces.

Touch Object Capacitance Of Touch Surface/s: change in touch surface/s' capacitance, caused by a touch object touching the touch surface/s. Also termed herein, e.g.: "additive capacitance" and "capacitance increase".

Traces—wires, resistors or a combination thereof which cause an electrical-connection between touch surfaces or between touch surfaces and a touch sensor.

Rn—resistance between touch surface Cn and touch sensor or touch surface Ck, depending on the context, where 'n' and 'k' are indices, e.g., 1, 2, 3; and k=n−1

Cn—touch surface 'n' or the untouched self-capacitance thereof, where 'n' is an index, e.g., 1, 2, 3.

ΔC—Additional capacitance of a touch surface, or of a group of touch surfaces (due to touch of same by a touching object)

ΔT—Time interval measured e.g. by the time interval measurement method as described in FIG. 6 in the Tasher patent (FIG. 12 herein)

$\Delta T_{TC}$—ΔT during touch detection $\Delta T_{Cn}$—ΔT when Cn is touched $\Delta T_{CnCk}$—ΔT when both Cn and Ck are touched respectively, where 'n' and 'k' are indices, e.g., 1, 2, 3.

$\Delta C_{Mn}{}'$—Computed ΔC from Mn where M is a measurement and 'n' is its index, e.g., 1, 2, 3.

ΔC'—Computed ΔC in general.

ΔCn"—Recovered ΔC of Cn where 'n' is an index, e.g., 1, 2, 3.

The term "most" may be used herein in the sense of "at least most" i.e. may include "most or all".

Certain embodiments of the present invention seek to conserve at least one of cost, space, and complexity in a touch panel, by having a single touch sensor serve more than one touch surface in the touch panel, including determining whether the $1^{st}$ touch surface, or the $2^{nd}$, or both, were touched. The 2 touch surfaces may be connected to the touch sensor but the leads to one touch surface have much higher resistance than the leads to the other, and the touch sensor is used twice—first a long-term measurement, and then a short-term measurement, such that for the former measurement both surfaces (high-resistance, low-resistance) respond, and for the latter measurement only one of the surfaces responds. The difference between those 2 measurements may be computed, yielding information regarding both touch surfaces, "for the price of" a single sensor.

Certain embodiments of the present invention seek to reduce the number of touch sensors required to cover a touch panel of a given size.

Certain embodiments of the present invention seek to provide a touch sensor serving multiple touch surfaces and wherein the resistance between the sensor and each of the surfaces is significantly different.

In the 'single-layer' technology of Publication US 20120262419 al of U.S. Ser. No. 13/533,618, shapes and arrangements of touch surfaces are described. For example, staggering touch surfaces exploits the fact that a touch object typically touches more than one touch surface.

The term "single-layer technology" as used herein is intended to include at least the following variations (systems, apparatus, modules and methods) described in Publication US 20120262419 of U.S. Ser. No. 13/533,618:

Single-layer technology variation 1. A multi touch sensing module comprising: a plurality of electrically conductive touch surfaces, each connected to at least one trace, wherein the touch surfaces are arranged in more than two columns, each including more than 2 touch surfaces, wherein touch surfaces in corresponding positions in said columns form staggered rows, and all touch surfaces reside in a single layer of electrically conductive material.

Single-layer technology variation 2. The module of variation 1 wherein most of the touch surfaces are substantially longer along one dimension than along another dimension.

Single-layer technology variation 3. The module of variation 1 wherein most traces pass between, rather than through, touch surfaces.

Single-layer technology variation 4. The module of variation 2 wherein the touch surfaces have axes and the touch surfaces are staggered such that the axes of at least most of the touch surfaces define a ratio between them which is equal, order of magnitude, to a staggering level defined by said staggered touch surfaces.

Single-layer technology variation 5. The module of variation 2 wherein the electrically conductive touch surfaces satisfy: 0.6*{stagger level}.

Single-layer technology variation 6. The module of variation 1 wherein said rows have a staggering level equal to 2.

Single-layer technology variation 7. The module of variation 1 wherein the touch surfaces are rectangular.

Single-layer technology variation 8. The module of variation 1 and also comprising:

a contact sensing device including touch sensors operative to sense contact between a touching object and at least one of the plurality of electrically conductive touch surfaces; and a processing unit, connected to the contact sensing device, which is operative for: reading self-capacitance measurements generated by the contact sensing device, and resolving the touch sensor measurements into multiple locations of respective multiple objects which have come into contact with the touch surfaces.

Single-layer technology variation 9. The module of variation 8 wherein the processing unit times contact sensing measurements carried out by the contact sensing device to occur in groups such that capacitively coupled touch panel elements are not measured simultaneously.

Single-layer technology variation 10. The module of variation 8 in which the processing unit adjusts at least one individual touch sensor reading to compensate for known capacitive coupling effects of adjacent touch panel elements on the individual touch sensor reading.

Single-layer technology variation 11. The module of variation 8 wherein said resolving comprises compensating for possible distortion caused by staggering between linear arrays of touch surfaces, by converting readings of sensors connected to touch surfaces into a matrix of computed theoretical capacitance readings of virtual surfaces partitioned from the touch surfaces to form non-staggered rows of surfaces.

Single-layer technology variation 12. The module of variation 8 wherein said resolving comprises identifying sensed peaks on the touch panel.

Single-layer technology variation 13. The module of variation 12 wherein said identifying comprises finding peaks which represent possible touches and applying a peak removal test to filter out peaks that do not represent real touches.

Single-layer technology variation 14. The module of variation 12 wherein a peak splitting procedure is applied.

Single-layer technology variation 15. The module of variation 12 wherein computing coordinates of each individual peak comprises, for each coordinate along an x or y axis:

computing a weighted average of sensor readings generated by the touch sensors adjacent said individual peak where the weight of each sensor reading comprises a coordinate of a center of the sensor along said axis.

Single-layer technology variation 16. The module of variation 8 wherein said resolving comprises identifying sensed peaks on the touch panel, and in which the processing unit computes X and Y coordinates of peaks using sets of virtual surfaces partitioned from the touch surfaces to form non-staggered rows of surfaces, and wherein more rows of virtual surfaces than columns of virtual surfaces are used for X coordinate computation, and more columns of virtual surfaces than rows of virtual surfaces are used for Y coordinate computation.

Single-layer technology variation 17. The module of variation 16 wherein within rows and columns used for coordinate computation, at least one almost-adjacent virtual surface around a peak is used only if the almost-adjacent surface's value is lower than or equal to a more directly-adjacent virtual surface around the peak.

Single-layer technology variation 18. The module of variation 1 wherein the traces extend beyond the active area of the touch panel only on one side of the touch panel and not on any side of the touch panel other than said one side.

Single-layer technology variation 19. The module of variation 1 wherein the portion of the traces connecting each of at least most of the touch surfaces with a corresponding active area terminal, are routed in non-straight lines such as a sequence of straight segments.

Single-layer technology variation 20. The module of variation 1 wherein the portion of the traces connecting each of at least most of the touch surfaces with a corresponding active area terminal, are routed in straight lines.

Single-layer technology variation 21. A method for multi touch sensing comprising:

providing a plurality of electrically conductive touch surfaces, each connected to at least one trace, wherein the touch surfaces are arranged in more than two columns, each including more than 2 touch surfaces, wherein touch surfaces in corresponding positions in said columns form staggered rows, and all touch surfaces reside in a single layer of electrically conductive material; and employing a processing unit which utilizes self-capacitance measurement for resolving multiple locations of multiple objects which have come into contact with the touch panel.

Single-layer technology variation 22. The method of variation 21 wherein most of the touch surfaces are substantially longer along one dimension than along another dimension.

Single-layer technology variation 23. The method of variation 21 wherein all traces pass between, rather than through, touch surfaces.

Single-layer technology variation 24. A computer program product, comprising a non-transitory tangible computer readable medium having computer readable program code embodied therein, said computer readable program code adapted to be executed to implement a touch detection method operative in conjunction with a plurality of electrically conductive touch surfaces, each connected to at least one trace, wherein the touch surfaces are arranged in more than two columns, each including more than 2 touch surfaces, wherein touch surfaces in corresponding positions in said columns form staggered rows, and all touch surfaces reside in a single layer of electrically conductive material, said method comprising: reading self-capacitance measurements and resolving the touch sensor measurements into multiple locations of respective multiple objects which have come into contact with the touch surfaces, wherein said resolving comprises partitioning virtual surfaces from the touch surfaces to form non-staggered rows of surfaces; and compensating for possible distortion caused by staggering between linear arrays of touch surfaces, by converting readings of sensors connected to touch surfaces into a matrix of computed theoretical capacitance readings of the virtual surfaces.

Single-layer technology variation 25. Apparatus according to variation 24 residing in a processing unit.

Single-layer technology variation 26. A method according to variation 21 wherein at least most of the touch surfaces have a first axis and a second, Y axis longer than the first axis, and wherein a peak is deemed to be indicative of two close touch objects along a single column arranged along the second axis, rather than being indicative of a single touch object, if a touch detection topology, characterized by a long flat plateau with sharp slopes along the second axis and a much shorter plateau, ruling out a thumb or wide single object, along the first axis, is detected.

Single-layer technology variation 27. The module of variation 13 wherein at least one first peak which is adjacent to a second peak with a higher grade than the first peak, is filtered out.

Single-layer technology variation 28. The module of variation 8 wherein said resolving comprises using image processing.

Single-layer technology variation 29. The module of variation 8 wherein said resolving comprises using polynomial approximation.

Certain embodiments of the present invention seek to use a single touch sensor to measure multiple touch surfaces e.g. by suitably arranging internal traces and terminal traces on a touchscreen. The teachings of this herein may be used, inter alia, to yield an improvement in the shapes and arrangements achieved in the 'single-layer' technology of Publication US 20120262419 of U.S. Ser. No. 13/533,618.

Certain embodiments of the present invention seek to detect touch on each of a multiplicity of touch surfaces separated by electrical resistances, using a single touch sensor.

Certain embodiments of the present invention seek to provide a touch panel layout on a single conductive material layer using touch sensor and touch surface configurations, for example, as above.

In accordance with an aspect of the presently disclosed subject matter, there is provided a single touch sensor capable of sensing touch on more than one touch surface.

In accordance with an aspect of the presently disclosed subject matter, there is further provided a touch panel whose layout supports a single touch sensor capable of sensing touch on more than one touch surface.

In accordance with an aspect of the presently disclosed subject matter, there is provided a touch panel whose characteristics allow several touch surfaces to be distinguished from one another by a single touch sensor, the characteristics including at least some of: Rs, Touch panel dimensions, Touch sensing method, manufacturing process parameters, e.g. min trace width and min cut width and Trace patterning style.

In accordance with an aspect of the presently disclosed subject matter, there is yet further provided a method for multi-touch detection using a single layer ITO (Indium Tin Oxide) including providing a single touch sensor capable of sensing touch on more than one touch surface separated by electrical resistances.

In accordance with an embodiment of the presently disclosed subject matter, there is yet further provided an apparatus having at least one of the following characteristics:

Two columns which are horizontally interleaved such that surfaces are wider hence less touch surfaces are employed to cover a panel.

The C2 traces pass right to the bottom and are merged with C1 at the touch panel perimeter, on the FPC or on PCB, if applicable.

C2 traces pass through the zigzag area between the interleaved columns or between two non-interleaved columns The resulting schematic model corresponds to FIGS. 1c, and 1d In accordance with an aspect of the presently disclosed subject matter, there is yet further provided a touch panel layout on a single conductive material layer using touch sensor and touch surfaces configuration as described and claimed above.

In accordance with an embodiment of the presently disclosed subject matter, there is yet further provided an apparatus wherein two touch surfaces are connected to a single touch sensor.

In accordance with an embodiment of the presently disclosed subject matter, there is yet further provided an apparatus wherein more than two touch surfaces are connected to a single touch sensor.

In accordance with an embodiment of the presently disclosed subject matter, there is yet further provided an apparatus wherein more than three touch surfaces are connected to a single touch sensor.

In accordance with an embodiment of the presently disclosed subject matter, there is yet further provided an apparatus wherein a different time interval or time constant is applied for more than two sensors.

In accordance with an embodiment of the presently disclosed subject matter, there is yet further provided an apparatus wherein resistors are in order of different magnitude, and wherein the overall system is broken down to several smaller systems.

In accordance with an embodiment of the presently disclosed subject matter, there is yet further provided a different touch panel manufactured using a material with non-negligible resistance.

In accordance with an embodiment of the presently disclosed subject matter, there is yet further provided an apparatus which includes a capacitive touchscreen implemented using a transparent conductive material and wherein the traces resistance $R_{TRACE}$ is controlled by setting the traces' width and length using Equation XV herein.

In accordance with an embodiment of the presently disclosed subject matter, there is yet further provided an apparatus wherein the transparent conductive material comprises Indium Tin Oxide (ITO) which has a typical sheet resistance $R_S$ in the range of 10 to 800 Ω/square (order of magnitude).

In accordance with an embodiment of the presently disclosed subject matter, there is yet further provided a method which employs a reduced number of required controller pins.

In accordance with an aspect of the presently disclosed subject matter, there is yet further provided a device belonging to the following set of devices: capacitive buttons, track point, touch panel, touch pad (track pad), rows and columns based self capacitive touchscreen, capacitive sliders, capacitive rollers, which includes a single touch sensor capable of sensing touch on more than one touch surface.

In accordance with an embodiment of the presently disclosed subject matter, there is yet further provided an apparatus wherein linear correction factors K11, K12, K21 and K22 for at least some of e.g. each touch surface and for at least some of e.g. each measurement are applied, thus creating and employing the equations IV, V herein.

In accordance with an embodiment of the presently disclosed subject matter, there is yet further provided an apparatus wherein the correction factors are extracted from a circuit model.

In accordance with an embodiment of the presently disclosed subject matter, there is yet further provided an apparatus wherein the correction factors are extracted from calibration measurements.

In accordance with an embodiment of the presently disclosed subject matter, there is yet further provided an apparatus wherein the calibration measurements are done on a circuit model using a simulation tool.

In accordance with an embodiment of the presently disclosed subject matter, there is yet further provided an apparatus wherein the calibration measurements are done on the circuit itself with actual measurements.

In accordance with an aspect of the presently disclosed subject matter, there is yet further provided a calibration process which includes some or all of the following steps:

a. Leave C1 and C2 untouched.
b. Make a short and long time interval measurements and record the results
c. Touch only C1 and repeat step b
d. Touch only C2 and repeat step b
e. Touch both C1 and C2 and repeat step b
f. If required, repeat steps a to 3 with a different touch object.
g. Set K11, K12, K21 and K22 correction factors so that the resulting object(s) additive capacitance will best match its real value.

In accordance with an aspect of the presently disclosed subject matter, there is yet further provided a capacitive sensing element comprising a touch sensor which is connected to each of the touch surfaces via different electrical resistances.

In accordance with an embodiment of the presently disclosed subject matter, there is yet further provided an apparatus wherein the touch sensor evaluates the intensity of the touch on each of the touch surfaces.

In accordance with an embodiment of the presently disclosed subject matter, there is yet further provided an apparatus wherein the resistances differ by at least one order of magnitude from one another.

In accordance with an aspect of the presently disclosed subject matter, there is yet further provided a touch sensing module comprising
  a multiplicity of touch surfaces, shaped from a single layer 'ITO like' material, disposed on an insulating surface, covering a touch panel area, for which, the coordinates of multiple touch objects can be detected
  where at least two of the touch surfaces are connected to a single touch sensor via different electrical resistances
  and where the connected touch surfaces and the touch sensor form a sensing element.

In accordance with an embodiment of the presently disclosed subject matter, there is yet further provided an apparatus where the resistances differ by at least one order of magnitude from one another.

In accordance with an embodiment of the presently disclosed subject matter, there is yet further provided an apparatus where the connection between the touch surfaces is done inside the touch panel active area.

In accordance with an embodiment of the presently disclosed subject matter, there is yet further provided an apparatus where the connection between the touch surfaces is done outside the touch panel active area, using metal bridges.

In accordance with an embodiment of the presently disclosed subject matter, there is yet further provided an apparatus wherein the metal bridges are located on at least one of: the perimeter, on the FPC, on the PCB.

At least the following embodiments may be provided:

Embodiment 1

A touch sensing system comprising:
  a set of touch surfaces in a touch panel including a population of touch surfaces; and
  at least one touch alert generator operative for separately alerting for touch on each of, and both of, at least first and second touch surfaces from among the population of touch surfaces,
  wherein the alert generator is operative to determine capacitance of the first touch surface, to determine touch object capacitance of the first and second touch surfaces, and to compute a difference between the two capacitances, thereby to generate an approximation for touch object capacitance of the second touch surface.

Embodiment 2

A system according to embodiment 1 wherein the first and second touch surfaces are connected to the single touch alert generator via a first electrical resistance and via a second electrical resistance higher than the first electrical resistance, respectively.

Embodiment 3

A system according to embodiment 1 or embodiment 2 wherein the alert generator is operative to determine capacitance of the first touch surface when touched, determine touch object capacitance of the first and second touch surfaces when touched, and compute a difference between the two capacitances, thereby to generate an approximation for touch object capacitance of the second touch surface when touched.

Embodiment 4

A system according to embodiment 3 wherein the alert generator is operative to improve the approximation for touch object capacitance of the second touch surface using at least one pre-calibrated coefficient k to improve approximation of touch object capacitance of the second touch surface when not touched.

Embodiment 5

A system according to embodiment 2 wherein the resistances between the touch alert generator and each of the surfaces connected thereto differ by at least one order of magnitude.

Embodiment 6

A system according to any of the previous embodiments wherein the touch surfaces are formed from a single layer of material disposed on an insulating surface covering a touch panel area.

Embodiment 7

A system according to embodiment 2 or 5 wherein at least one of the resistances are at least partly provided by a trace connecting at least one touch surface to the touch alert generator.

Embodiment 8

A system according to embodiment 7 wherein the set of touch surfaces defines a touch panel active area and wherein at least one trace electrically connecting between at least one touch surface and the touch alert generator is disposed inside the touch panel active area.

Embodiment 9

A system according to embodiment 7 or 8 wherein the touch surface-touch alert generator trace comprises a transparent conductor.

Embodiment 10

A system according to embodiment 7 or 8 or 9 wherein the set of touch surfaces comprises an array, having a vertical length, of touch surfaces arranged in rows and columns and wherein crossing between traces is prevented, thereby to facilitate construction of a single-layer touch panel, in that, for at least some sets of at least two touch surfaces each served by, and connected in series to, a single touch alert generator:

each of the sets include at least a first touch surface in a first row and a second touch surface in a row adjacent to the first row.

Embodiment 11

A system according to embodiment 10 wherein the second touch surface's vertical distance from the first touch surface is less than two-thirds of the vertical length, thereby to reduce interference between touch surfaces.

Embodiment 12

A system according to embodiment 2 or 5 or 7-9 wherein resistance between each of the touch surfaces and the touch alert generator, differs from resistance between each other touch surface and the touch alert generator, by at least a factor of 2.

Embodiment 13

A system according to embodiment 7 or 8 or 9 wherein difference in resistance between first and second touch surfaces connected via trace to, and served by, a single touch alert generator, is provided by providing first and second traces, to the first and second touch surfaces respectively, which differ in length.

Embodiment 14

A system according to embodiment 7 or 8 or 9 or 13 wherein difference in resistance between first and second touch surfaces connected via trace to, and served by, a single touch alert generator, is provided by providing traces to the first and second touch surfaces which differ in width.

Embodiment 15

A system according to embodiment 12 wherein the second trace doubles back on itself at least once.

Embodiment 16

A system according to embodiment 3 or 4 wherein the touch surfaces served by the touch alert generator also comprise a third touch surface and wherein the touch alert generator is also operative to determine touch object capacitance of the first, second and third touch surfaces, and to compute a difference between the touch object capacitance of the first, second and third touch surfaces, and the capacitance of the first and second touch surfaces, thereby to generate an approximation for touch object capacitance of the third touch surface.

Embodiment 17

A system according to embodiment 2 or 5 or 7-9 or 12 wherein the touch alert generator is controlled to determine capacitance over different time intervals, so as to invoke participation of different subsets of the touch surfaces, including a first determination of capacitance in which only the first touch surface, connected via the first electrical resistance which is relatively low, participates and a second determination, conducted over a longer time period than the first determination, in which at least the at least first and second touch surfaces both participate.

Embodiment 18

A system according to embodiment 17 wherein the touch surfaces served by the touch alert generator also comprise a third touch surface and wherein the touch alert generator is controlled to effect a third determination of capacitance, conducted over a longer time period than the second determination, in which the first, second and third touch surfaces all participate, and wherein in the second determination, only the at least first and second touch surfaces participate.

Embodiment 19

A system according to any of the preceding embodiments wherein the alert generator is operative to determine capacitance by time interval measurement and wherein different currents are used for different touch surfaces.

Embodiment 20

A system according to any of the previous embodiments wherein the alert generator is operative to determine capacitance by a charge transfer technique.

Embodiment 21

A system according to embodiment 11 wherein resistance between each of the touch surfaces and the touch alert generator, differs from resistance between each other touch surface and the touch alert generator, by at least an order of magnitude.

Embodiment 22

A system according to embodiment 7 or 8 or 9 or 13 or 14 wherein for at least some pairs of first and second touch surfaces each served by, and connected in series to, a single touch alert generator, resistance between the touch alert generator and the first touch surface, which is further from the single touch alert generator, is at least twice the resistance between the touch alert generator and the second touch surface which is closer to the single touch alert generator.

Embodiment 23

A system according to embodiment 4 wherein the at least one pre-calibrated coefficient k is extracted from at least one of a circuit model and calibration measurements.

Embodiment 24

A system according to embodiment 4 or embodiment 23 wherein the at least one pre-calibrated coefficient k comprises at least one linear correction factor per touch surface for long capacitance measurement and same for short capacitance measurement.

Embodiment 25

A touch sensing method comprising: providing a set of touch surfaces in a touch panel including a population of touch surfaces; and providing at least one touch alert generator separately alerting for touch on each of, and both of, at least first and second touch surfaces from among the population of touch surfaces, wherein the alert generator is operative to determine capacitance of the first touch surface, to determine touch object capacitance of the first and second touch surfaces, and to compute a difference between the two capacitances, thereby to generate an approximation for touch object capacitance of the second touch surface.

Embodiment 26

A system according to embodiment 3 or 4 or 23 or 24 wherein the alert generator is operative to improve the approximation for touch object capacitance of the second touch surface using at least one pre-calibrated coefficient k to improve approximation of difference between capacitance of at least one touch surface when touched and when not touched.

Also provided, excluding signals, is a computer program comprising computer program code means for performing any of the methods shown and described herein when the program is run on a computer, and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

The present invention may be described, merely for clarity, in terms of terminology specific to particular system versions, individual products, and the like. It will be appreciated that this terminology is intended to convey general principles of operation clearly and briefly, by way of example, and is not intended to limit the scope of the invention to any particular system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein.

BRIEF DESCRIPTION OF THE DRAWINGS

Certain embodiments of the present invention are illustrated in the following drawings:

FIG. 1b is a simplified circuit model of the schematic model depicted in FIG. 1a.

FIG. 2b is a simplified circuit of the schematic block diagram depicted in FIG. 2a.

FIG. 3b is a simplified circuit of the schematic block diagram depicted in FIG. 3a.

FIG. 3c is a table presenting ΔT and ΔC' simulation results of the embodiment of FIGS. 3a-3b, analogously to the table of FIG. 2b for the embodiment of FIGS. 2a-2b; the table may include some or all of the cells and/or rows/columns shown therein.

FIG. 4g is a table which presents some of the attributes of the touch panel layout configurations depicted in FIGS. 4a-4f; the table may include some or all of the cells and/or rows/columns shown therein.

FIG. 5a is a simplified top view of a touch panel layout comprising eleven touch surfaces columns with ten touch surfaces in each column.

FIG. 5b is a zoom-in view of two columns from the touch panel described in FIG. 5a.

FIG. 6 is a diagram illustrating examples of suitable Touch panel layouts which support a single touch sensor capable of sensing touch on more than one touch surface.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question.

DETAILED DESCRIPTION OF CERTAIN EMBODIMENTS

Figure 1A:
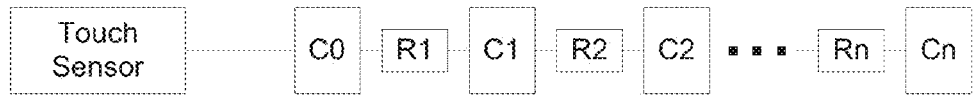
FIG. 1a is a schematic block diagram of an embodiment of the invention, in which several touch surfaces are connected to a single touch sensor.
Figure 1B:
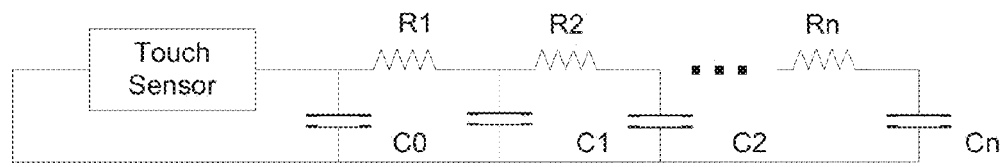

FIG. 1a is a schematic block diagram of an embodiment of the invention, in which several touch surfaces are connected to a single touch sensor. FIG. 1b is a simplified circuit model of the schematic model depicted in FIG. 1a.

Figure 1C:
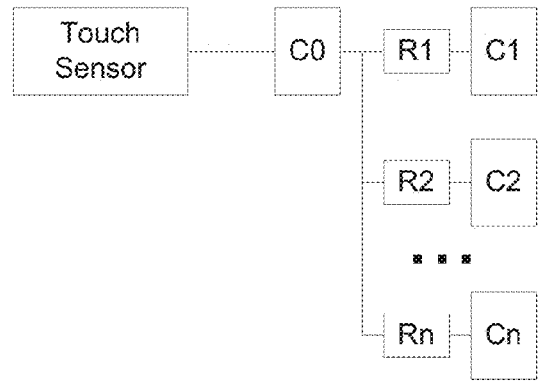
FIG. 1c is a schematic block diagram of another embodiment of the invention, in which several touch surfaces are connected to a single touch sensor.
Figure 1D:
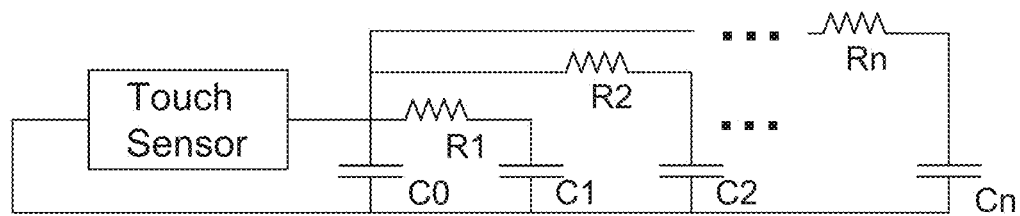
FIG. 1d is a simplified circuit corresponding to the schematic block diagram depicted in FIG. 1c.

FIG. 1c is a schematic block diagram of another embodiment of the invention, in which several touch surfaces are connected to a single touch sensor. FIG. 1d is a simplified circuit corresponding to the schematic block diagram depicted in FIG. 1c.

In FIGS. 1a-1d, generally, elements marked R are resistors and elements marked C are capacitors. C0 represents the parasitic capacitance coupled to the touch sensor. Such capacitance may include, for example, the touch sensor self capacitance and circuit board capacitance near the touch sensor. Rn is the n'th resistance and Cn is the n'th touch surface. So, in each of FIGS. 1a-1d, n resistances corresponding to n touch surfaces may be considered. C1 to Cn represent a group of touch surfaces, all connected via different resistances to a single touch sensor. R1 to Rn represent a group of resistors connecting each touch surface to the touch sensor directly or via other touch surfaces so that the resistance between the touch sensor and each of the touch surfaces is significantly different. Preferably, resistance of a path from an individual touch surface to the sensor is an order of magnitude different from the resistance of any other path from any other touch surface to the same sensor.

To sense the capacitance of each touch surface, the touch sensor conducts a set of measurements over different time intervals, also termed herein "time constants", which takes into account both the resistance and the capacitance of the touch surfaces. Each measurement may measure a different set of touch surfaces.

For example, consider a case in which there are three capacitive touch surfaces C1, C2 and C3 arranged as in FIG. 1c, and also that: R1<R2<R3. In this case, the following three measurements may be conducted:

a first measurement with a small time constant aiming to detect touch on C1, a second measurement with a medium time constant aiming to detect touches on C1 and on C2 and a third measurement with a large time constant aiming to detect touches on C1, on C2 and on C3.

Each measurement time constant is set to exceed the RC equivalent of only those touch surfaces measured in the current measurement. The time constant may relate for example, to the estimated time of the measurement in case where the touch sensor uses current source or charge transfer as a stimulus. The different time constant may also be determined at least partly by the measurement signal frequency and voltage gradient when the touch sensor uses an AC source as a stimulus.

From the abovementioned three measurements each of C1, C2 and C3 can be extracted. Similarly, sensing of a number of touch surfaces other than 3, using a single sensor, may be provided.

Several methods in which touch surface capacitance can be measured are known in the art, such as but not limited to that described in co-pending U.S. Pat. No. 7,797,115 to Tasher et al, entitled "Time interval measurement for capacitive detection" and referred to herein as U.S. Pat. No. 7,797,115 or "the Tasher patent". The term "Time interval measurement" as employed herein includes but is not limited to any of the following variations (as systems or as methods):

Time interval measurement variation 1. A method of generating a time interval measurement which is a monotonic function of the capacitance of a capacitive sensor, comprising: causing a voltage across a capacitive sensor to change at least one time; generating a time interval measurement which is a monotonic function of capacitance of the capacitive sensor by measuring at least one time interval during each of which the changing voltage across the sensor ranges between two predetermined values, wherein if the time interval measurement is generated by measuring at least two time intervals then the measuring is cumulative, and wherein the predetermined values corresponding to at least one of the at least one time interval are both non-zero; and analyzing the generated time interval measurement in order to detect or not detect presence of an object near the capacitive sensor.

Time interval measurement variation 2. A module for generating a time interval measurement which is a monotonic function of the capacitance of a capacitive sensor, comprising: apparatus for causing a voltage across a capacitive sensor to change at least one time; apparatus for generating a time interval measurement which is a monotonic function of capacitance of the capacitive sensor, including apparatus for measuring a time interval during which the changing voltage across the sensor ranges between two predetermined values or a means for cumulatively measuring at least two time intervals during each of which the changing voltage across the sensor ranges between two predetermined values, wherein the predetermined values corresponding to at least one measured time interval are both non-zero; and a clock generator configured to generate a clock signal, wherein the clock generator is configured to selectively provide a jitter in the generated clock signal.

Time interval measurement variation 3. The method of variation 2, wherein the means for generating includes a counter, and wherein the generated clock signal or a function thereof is provided to the counter.

Time interval measurement variation 4. A module for generating a time interval measurement which is a monotonic function of the capacitance of a capacitive sensor, comprising: apparatus for causing a voltage across a capacitive sensor to change at least one time; apparatus for generating a time interval measurement which is a monotonic function of capacitance of the capacitive sensor, including a means for measuring a time interval during which the changing voltage across the sensor ranges between two predetermined values or a means for cumulatively measuring at least two time intervals during each of which the changing voltage across the sensor ranges between two predetermined values, wherein the predetermined values corresponding to at least one measured time interval are both non-zero; and a controller configured to configure at least one operational parameter affecting operation of the module.

Time interval measurement variation 5. A module for generating a time interval measurement which is a monotonic function of the capacitance of a capacitive sensor, comprising:

a means for causing a voltage across a capacitive sensor to change at least one time;

a means for generating a time interval measurement which is a monotonic function of capacitance of the capacitive sensor, including a means for measuring a time interval during which the changing voltage across the sensor ranges between two predetermined values or a means for cumulatively measuring at least two time intervals during each of which the changing voltage across the sensor ranges between two predetermined values, wherein the predetermined values corresponding to at least one measured time interval are both non-zero; and a controller configured to receive the generated time interval measurement and to analyze the generated time interval measurement to detect or not detect presence of an object near the sensor.

Time interval measurement variation 6. A capacitive detection method comprising: causing each voltage across at least one capacitive sensor in a capacitive sensing area to change at least one time; for each of the at least one capacitive sensor, generating a time interval measurement which is a monotonic function of capacitance of the capacitive sensor by measuring at least one time interval during each of which the changing voltage across the sensor ranges between two non-zero predetermined values, wherein if the time interval measurement is generated by measuring at least two time intervals then the measuring is cumulative; and analyzing the at least one generated time interval measurement corresponding to the at least one capacitive sensor in order to detect or not detect presence of an object near the capacitive sensing area.

Time interval measurement variation 7. The method of variation 6, wherein the at least one capacitive sensor includes at least two capacitive sensors, further comprising:

if presence was detected, analyzing generated time interval measurements for the at least two capacitive sensors in order to detect position of the object.

Time interval measurement variation 8. A capacitive detection system, comprising: a capacitive sensing area comprising at least one capacitive sensor, a capacitive gauging module configured to cause each voltage across at least one sensor in the capacitive sensing area to change at least one time and configured to generate for each of the at least one sensor whose voltage was caused to change, a time interval measurement which is a monotonic function of capacitance of the capacitive sensor, the gauging module including at least one counter, wherein each counter corresponds to one sensor and is configured to measure a time interval during which the changing voltage across the corresponding sensor ranges between two non-zero predetermined values or configured to cumulatively measure at least two time intervals during each of which the changing voltage across the corresponding sensor ranges between two non-zero predetermined values; and a controller module configured to analyze the at least one generated time interval measurement corresponding to the at least one sensor whose at least one voltage was caused to change in order to detect or not detect presence of an object near the capacitive sensing area.

Time interval measurement variation 9. The system of variation 8, wherein the at least one capacitive sensor includes at least two capacitive sensors, the controller is further configured to analyze generated time interval measurements for the at least two capacitive sensors in order to detect position of an object whose presence was detected.

Figure 2A:
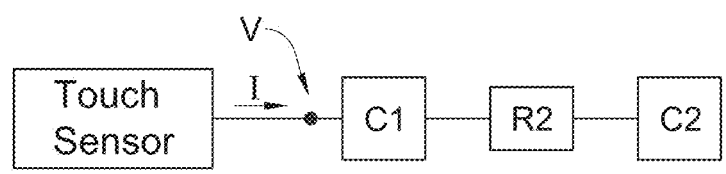
FIG. 2a is a schematic block diagram of another embodiment of the invention, in which two touch surfaces are connected to a single touch sensor.
Figure 2B:
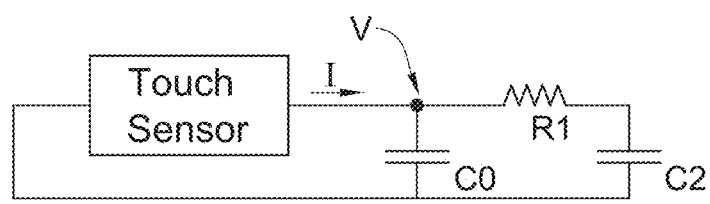

FIG. 2a is a schematic block diagram of another embodiment of the invention, in which two touch surfaces are connected to a single touch sensor. FIG. 2b is a simplified circuit of the schematic block diagram depicted in FIG. 2a. The touch sensor in FIGS. 2a and 2b uses a conventional time interval measurement method, e.g. as described in U.S. Pat. No. 7,797,115 to Tasher. In FIG. 2a, 'V' represents the voltage on the touch sensor and 'I' represents the touch sensor drive current. For the simplicity of the drawing and of the further description, the touch sensor parasitic capacitance is unified with C1—the untouched self capacitance. Uniting the parasitic capacitance with the touch surface capacitance is justified when the resistance between the touch sensor parasitic capacitance and the touch surface is small enough. Following is the computational formula that describes the FIG. 2b circuit when the touch sensor stimulates the circuit with a constant current 'I' when t≥0:

$$\frac{V}{I} = \frac{R2 * C2^2}{(C1+C2)^2} * \left(1 + e^{-t*\frac{C1+C2}{R2*C1*C2}}\right) + \frac{1}{C1+C2} * t \qquad (I)$$

Figure 12:
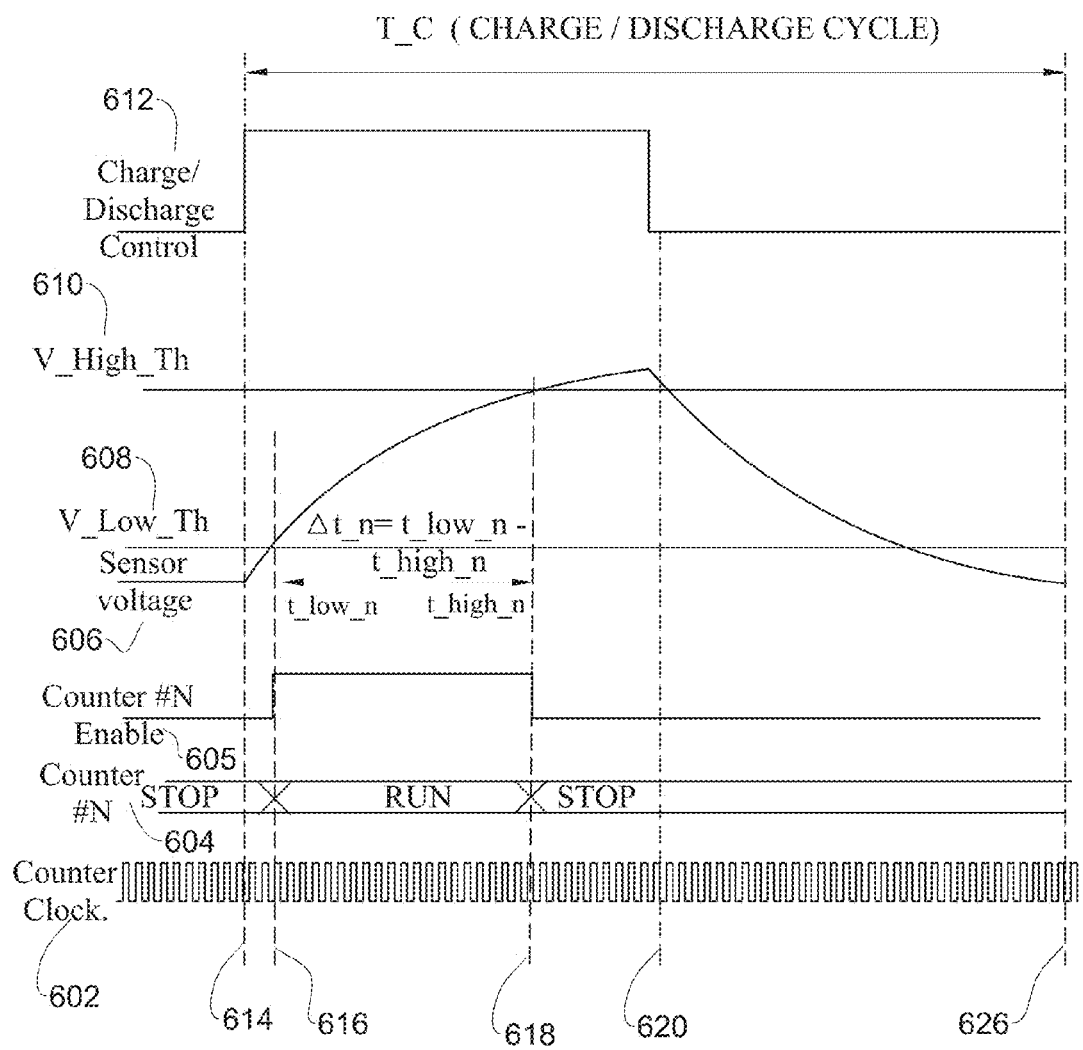
FIG. 12 (prior art) is a copy of FIG. 6 in the Tasher patent referred to herein.

A possible application of FIG. 6 in the Tasher patent, which is identical to FIG. 12 herein, to certain embodiments of the present invention is now described in detail, using the following notation:

Time interval is measured between V_Low_Th and V_High_Th voltage thresholds (e.g. 608, 610 respectively as illustrated in FIG. 6 of U.S. Pat. No. 7,797,115).

t1=t_low_n 616 e.g. as described in FIG. 6 of U.S. Pat. No. 7,797,115 t2=t_high_n 618 e.g. as described in FIG. 6 of U.S. Pat. No. 7,797,115

Δt=t2−t1

ΔV=V_High_Th−V_Low_Th

Short time interval measurement, also referred to herein as "small time constant measurement" is a time interval measurement which is so short that only a small subset, e.g. only one, of the touch surfaces served by a single sensor and having different resistances, is able to respond during the interval of measurement.

Medium time interval measurement—a time interval measurement which is neither short as defined above nor long as defined below.

Long time interval measurement, also referred to herein as "large time constant measurement": Typically, the long time interval measurement is so long that all touch surfaces served by the single sensor and having different resistances, are able to respond during the interval of measurement.

When $$0 \le t1, t2 \ll \frac{R2*C1*C2}{C1+C2}$$

(termed herein a very small time constant), formula (I) can be approximated by:

$$\frac{\Delta V}{I} = \frac{1}{C1} * \Delta t \qquad (II)$$

When $$t1, t2 \gg \frac{R2*C1*C2}{C1+C2}$$

(termed herein a very large time constant), formula (I) can be approximated by:

$$\frac{\Delta V}{I} = \frac{1}{C1+C2} * \Delta t \qquad (III)$$

Therefore, the capacitance of each of two touch surfaces served by a single sensor can be measured by conducting two measurements at two respective time intervals; one that satisfies the approximation of equation (II) and another that satisfies the approximation of equation (III). Practically, due to physical and electrical constraints, it is not always possible to set the two measurements to fully comply with equations (II) and (III). In such a case, calibration methods e.g. as described herein may be used to improve the estimate of the touch intensity on each of touch surfaces C1 and C2.

Method A: In one example, C1's and C2's capacitance increase can be estimated using equations (II) and (III) although the estimated values are not completely accurate. In such a case, a watermark e.g. threshold may be set, below which a touch on the corresponding touch surface is ignored in order to avoid false touch detection due to the estimation approximation inaccuracy. Such a watermark may be set per the requirements of the system and as per the level of inaccuracy resulting from using equations (II) and (III).

For example, if each of C1 and C2 equals 10 pF when not touched, and a touch on each of C1 and C2 typically adds 2 pF to the touched surface's capacitance, a watermark of 11 pF may be set for each of the recovered C1 and C2 capacitances from equations (II) and (III). If the recovered C1 is found to be above the watermark, a touch is recognized on C1 and if C2 is found to be above the watermark, a touch is recognized on C2.

Method B: In another example, linear correction factors, also termed herein "calibration factors" and "correction factors", per touch surface and per measurement (long and short) may be pre-calibrated and then applied, thus creating the following two equations (IV) and (V) that may be used instead of equations (II) and (III) correspondingly.

$$\frac{\Delta V}{I} = \frac{1}{K11*C1 + K12*C2} * \Delta t \qquad (IV)$$

$$\frac{\Delta V}{I} = \frac{1}{K21*C1 + K22*C2} * \Delta t \qquad (V)$$

Figure 2C:
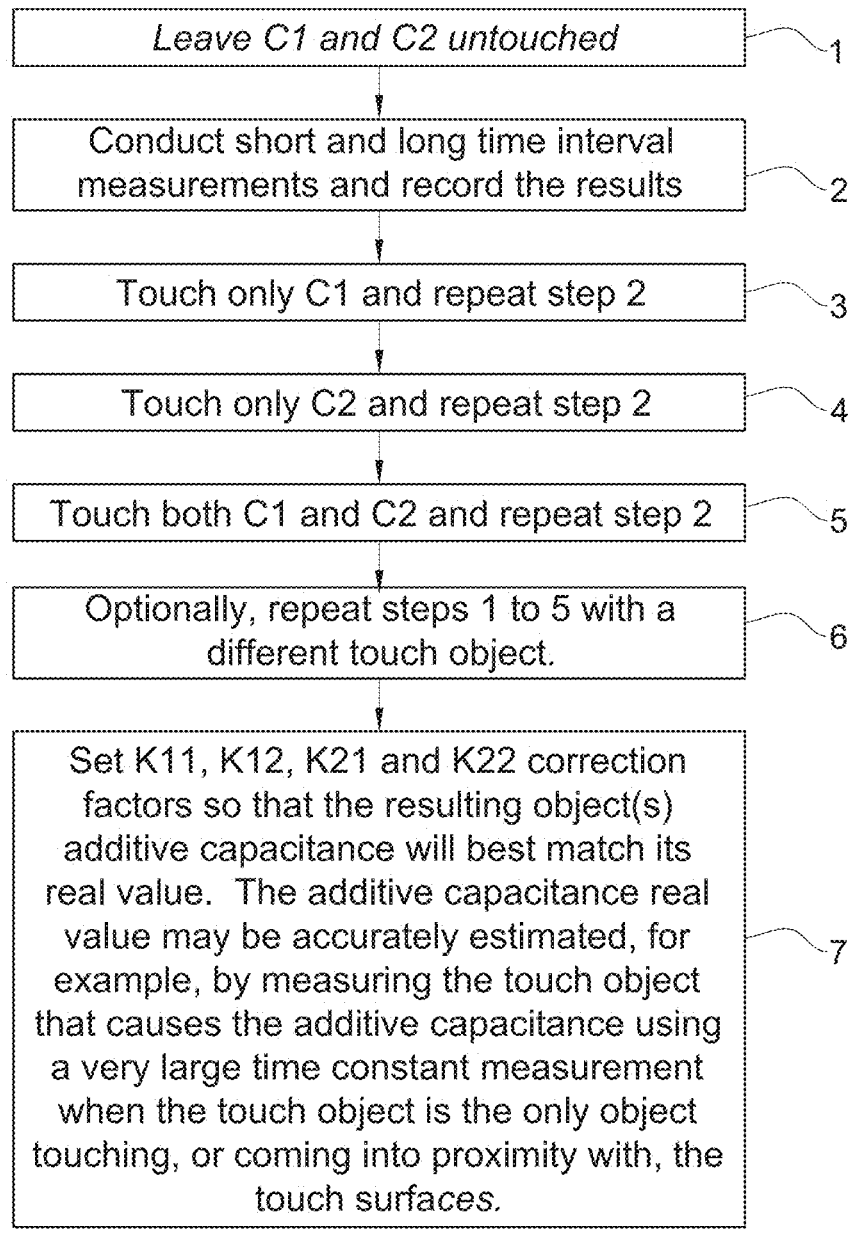
FIG. 2c is a simplified flow diagram of an example calibration process for generating coefficients to improve capacitance approximations; the process may comprise some or all of the illustrated steps, suitably ordered e.g. as shown.

K11, K12, K21 and K22 are the correction factors. The correction factors may be extracted from computational analysis of the electronic circuit comprising the sensor and touch surfaces or by carrying out calibration measurements during set-up. Such calibration measurement may either be done on a circuit model within a simulation tool or on the circuit itself with actual measurements. Following is an example of a calibration process which, as shown in FIG. 2c, may include some or all of the following steps, suitably ordered e.g. as shown:

1. Leave C1 and C2 untouched.
2. Conduct short and long time interval measurements and record the results
3. Touch only C1 and repeat step 2
4. Touch only C2 and repeat step 2
5. Touch both C1 and C2 and repeat step 2
6. Optionally, repeat steps 1 to 5 with a different touch object.
7. Set K11, K12, K21 and K22 correction factors so that the resulting object(s) additive capacitance will best match its real value. The additive capacitance real value may be accurately estimated, for example, by measuring the touch object that causes the additive capacitance using a very large time constant measurement when the touch object is the only object touching, or coming into proximity with, the touch surfaces.

Method C: According to another embodiment, equation (I) may be used, without simplification, to more accurately compute the capacitance of C1 and C2. The equation may for example be solved using analytic methods, numerical methods, polynomial approximation (e.g. polynomial interpolation as defined in Wikipedia) or the like.

Figure 9:
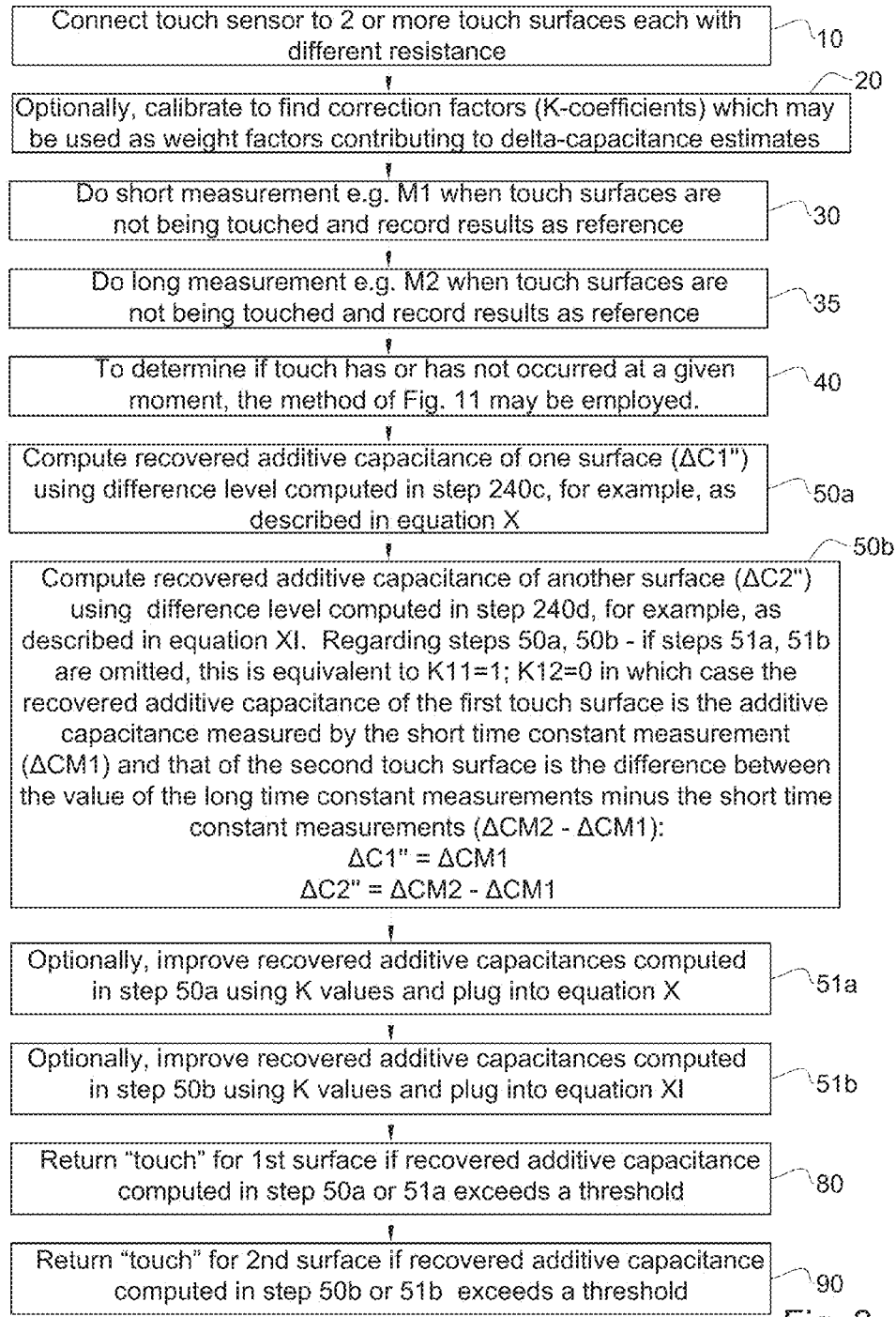
FIG. 9 is a simplified flow diagram of a process for sensing touch on discrete touch buttons such as typically used, for example, in cellular phones, tablets and other electronic devices; the process may comprise some or all of the illustrated steps, suitably ordered e.g. as shown.

The above are useful, inter alia, in performing step 20 of FIG. 9.

Following is a numerical example pertaining to FIG. 2a and FIG. 2b and employing a time interval touch sensor e.g. as described in U.S. Pat. No. 7,797,115 to Tasher. Below is a list of terms to be used from here on and parameters value assignment to be used throughout this example.

R2=500 kΩ—The resistance between C1 and C2 touch surfaces
C1=10 pF—Untouched surface self capacitance
C2=10 pF—Untouched surface self capacitance
ΔC=2 pF—Additional capacitance of C1 or C2 due to touch
$I_{M1}$=20 uA—Short time interval measurement (M1) of current 'I'.
$I_{M2}$=0.5 uA—Long time interval measurement (M2) of current 'I'
VCC=4 Volt—Touch Sensor power supply
V_Low_Th=1 Volt—Lower 'V' threshold as depicted in FIG. 12 (FIG. 6 of U.S. Pat. No. 7,797,115
V_High_Th=3 Volt—Upper 'V' threshold as depicted in 12 (FIG. 6 of U.S. Pat. No. 7,797,115
CNT—Counter 604 as depicted in 12 (FIG. 6 of U.S. Pat. No. 7,797,115
CNT_RD—CNT reading of M1 or M2 measurements
CNT_F=100 MHz—Frequency of CNT clock 602 as depicted in FIG. 6 of U.S. Pat. No. 7,797,115
ΔT=CNT_RD/CNT_F—Time interval (Δt) recovery from CNT reading
$\Delta T_{NT}$—ΔT=Δt=t2−t1 when C1 and C2 are not touched. t2 and t1 are not known so the operational definition is based on Counter_reading (CNT_RD) and Counter_clock_frequency (CNT_F), both of which are known. It is appreciated that $\Delta T_{NT}$ is a private case of ΔT when the surfaces are not touched.
$\Delta T_{TC}$—ΔT during touch detection
$\Delta T_{C1}, \Delta T_{C2}, \Delta T_{C1C2}$—ΔT when C1, C2 and both are touched respectively
$\Delta C_{M1}', \Delta C_{M2}', \Delta C'$—Computed ΔC from M1, from M2 or in general respectively
ΔC1″, ΔC2″—Recovered ΔC of C1, C2 respectively after correction In this example, short and long time intervals are achieved by using different drive currents. However it is appreciated that there are other ways to control the time intervals, for example, by varying upper and lower voltage threshold levels. Also note M1 and M2 may use a different CNT_F. For example, since M2 is typically longer than M1, M2 may use a lower CNT_F in order to reduce power consumption or to save bits in CNT.

Figures 2D, 3A:
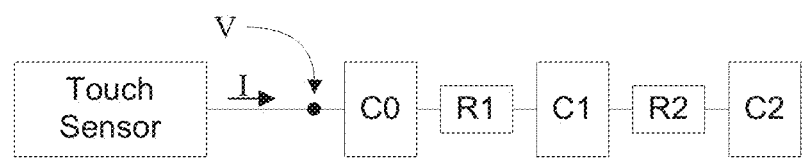
FIG. 2d is a table presenting ΔT and ΔC' simulation results at different touch configurations; the table may include some or all of the cells and/or rows/columns shown therein.
FIG. 3a is a schematic block diagram of yet another embodiment of the invention, in which two touch surfaces are connected to a single touch sensor.

The table of FIG. 2d summarizes ΔT and ΔC' simulation results with the above parameters at M1 and M2 measurements and at different touch configurations using the following equation (VI) which may be used for ΔC recovery from the measurement results, based on equations (II) and (III).

$$\Delta C' = \frac{I}{\Delta V} * (\Delta T_{TC} - \Delta T_{NT}) \quad (VI)$$

From the table of FIG. 2d, it is apparent that in this example, ΔC' of M2 was reasonably accurate, while ΔC' of M1 shows inaccuracy of up to 20%. To achieve more accurate results, linear correction factors may be used. In this example, M2 results were fairly accurate, which typically occurs if the long time interval measurement is long enough, so correction factors may be employed only for M1. This may be done by finding K11 and K12 that best fit a set of equations based on equations (IV) and (VI). For example, the following equations are extracted from the table of FIG. 2d. More equations may be extracted by simulating more touch combinations e.g. by using different ΔC values:

$$K11 * \Delta C = \frac{I}{\Delta V} * (\Delta T_{C1} - \Delta T_{NT}) \quad (VII)$$

$$K12 * \Delta C = \frac{I}{\Delta V} * (\Delta T_{C2} - \Delta T_{NT}) \quad (VIII)$$

$$K11 * \Delta C + K12 * \Delta C = \frac{I}{\Delta V} * (\Delta T_{C1c2} - \Delta T_{NT}) \quad (IX)$$

From the above equation set, the optimal K11 and K12 may be determined, e.g. for performing step 20 of FIG. 9 described below, using conventional approximation methods such as linear approximation which are well known in the art. For simplicity, only equations (VII) and (VIII) may be used to extract K11 and K12, yielding:
K11=2.3/2=1.15
K12=0.1/2=0.05
Using K11 and K12 correction factors, the corrected additive touch capacitance (e.g. the capacitance induced in each touch surface due to touch) of each touch surface is derivable using the following equations (X) and (XI):

$$\Delta C1'' = \frac{\Delta C_{M1} - K12 * \Delta C_{M2}}{K11 - K12} \quad (X)$$

$$\Delta C2'' = \frac{-\Delta C_{M1} + K11 * \Delta C_{M2}}{K11 - K12} \quad (XI)$$

To give a numerical example, applying the correction factors K11 and K12 as computed above on $\Delta C_{M1}$ and $\Delta C_{M2}$, as computed and as depicted in FIG. 2d, last row (when both touch surfaces with capacitance values of C1 and C2 are touched), using equations (X) and (XI), yields the following accurate result:

$$\Delta C1'' = \frac{2.4 - 0.05 * 4}{1.15 - 0.05} = 2$$

$$\Delta C2'' = \frac{-2.4 + 1.15 * 4}{1.15 - 0.05} = 2$$

Realistic ΔC values which represent real life scenario, for example, values equivalent to the additive capacitance of a finger touching one of the surfaces, may be selected for the correction factor measurements and computation to minimize detection errors. K21 and K22 may also be computed and used similarly; this may be appropriate in cases where the long time interval measurement cannot be made long enough. Sometimes using only K11 may yield accurate enough results; in such a case, setting K12 to '0' may simplify the computation.

Figures 3B, 3C:
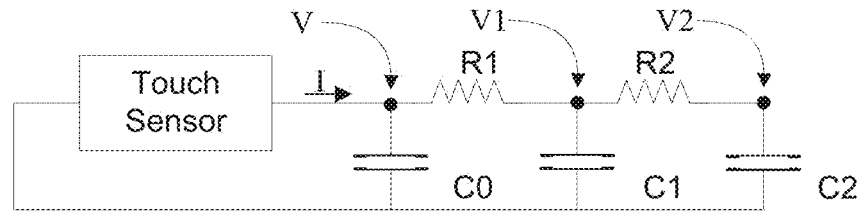

FIG. 3a is a schematic block diagram of yet another embodiment of the invention, in which two touch surfaces are connected to a single touch sensor. FIG. 3b is a simplified circuit of the schematic block diagram depicted in FIG. 3a. The touch sensor in FIGS. 3a and 3b may employ a time interval measurement method, e.g. as described in U.S. Pat. No. 7,797,115 to Tasher. The embodiment of FIGS. 3a-3b is generally similar to that of FIGS. 2a-2b but for the addition of R1 which represents resistance between the touch sensor and the C1 touch surface. V1 and V2 represent the voltages over C1 and C2 respectively. Notation and definitions presented above with reference to FIG. 2a and FIG. 2b are also utilized for the following description of FIGS. 3a-3b.

Following is a set of differential equations that describe FIG. 3b $$\frac{dV}{dt} = \frac{R1*I - V + V1}{R1*C0} \quad \text{(XII)}$$

$$\frac{dV1}{dt} = \frac{R2*V - (R2+R1)*V1 + R1*V2}{R2*R1*C1} \quad \text{(XIII)}$$

$$\frac{dV2}{dt} = \frac{V1 - V2}{R2*C2} \quad \text{(XIV)}$$

Following is a numerical example of use, in the embodiment of FIGS. 3a-3b, of a time interval touch sensor e.g. as described in U.S. Pat. No. 7,797,115 to Tasher. The list of terms to be used and parameters' value assignments may be the same as described above with reference to FIGS. 2a-2b except that in FIGS. 3a-3b:

R1=50 kΩ—The resistance between C1 and C2 touch surfaces
C0=20 pF—Parasitic capacitance of the touch sensor
$I_{M2}$=1 uA—Long time interval measurement (M2) current 'I'

The table of FIG. 3c summarizes ΔT and ΔC' simulation results of the embodiment of FIGS. 3a-3b, analogously to the table of FIG. 2b for the embodiment of FIGS. 2a-2b. As shown, the error is within the same order of magnitude as in the embodiment of FIGS. 2a-2b, and the same correction factor mechanism may be applied, mutatis mutandis, in order to improve the capacitance detection accuracy.

Whenever possible, R1 may be set at an order of magnitude less than R2. If possible select: R2≥R1*10, since if this condition is fulfilled, correction factors as described herein may be obviated.

Although the embodiments of FIGS. 2a, 2b, 3a and 3b are described as included a touch sensor which employs a time interval measurement method for capacitive measurement e.g. by deriving capacitance from current, as described in the Tasher patent, certain embodiments of the present invention may also be implemented using touch sensors which employ different capacitive measurement methods such as but not limited to a charge transfer method.

For example, a touch sensor may take two voltage measurements with a predefined time interval and measure the touch sensor terminal voltages at the beginning and at the end of the predefined time interval, for example, using an Analog to Digital Converter (ADC).

In another example a touch sensor may use a cyclic voltage or current source for stimulating circuits similar to those described in the above embodiments, for example, with reference to FIGS. 1a-2b, 3a-3b, 4a-4f, 5a-6. The cyclic voltage or current source may output a sinusoidal wave, square wave, triangular wave, chainsaw wave or other. In this case, the computation may be slightly different from the one described in any of FIGS. 2a, 2b, 3a and 3b. Varying the frequency and the drive strength may be used to differentiate between the "fast" (long time interval) and "slow" (short time interval) measurements. For example, a higher source frequency, a higher drive strength or both may be applied for M1 relative to a lower source frequency, drive strength or both for M2. The resistances between each of the touch surfaces and the sensor may be tuned differently to achieve capacitance detection with minimum error.

In yet another example a touch sensor may use a charge transfer stimulating method (e.g. charge transfer method as described in the Seguine article. for stimulating circuits similar to those described in the above embodiments, for example, as shown and described with reference to FIGS. 1a-2b, 3a-3b, 4a-4f, 5a-6. The touch sensor employing a charge transfer stimulating method typically:

a. discharges a previously charged reference capacitor and
b. compares the network voltage after the discharge to a baseline. For example, if the voltage exceeds the baseline by more than a predefined threshold or watermark, a touch may be detected.

Using a serial resistor between the touch sensor and the touch surfaces may slow the stabilization time and give time to measure the transition effect which is employed for multiple touch surface detection.

A combination of several measurement methods may be used to implement the present invention, for example, referring to FIGS. 3a and 3b, one may choose to implement M1 with time interval measurement method e.g. as described in the Tasher patent and M2 with the charge transfer method. Other combinations are possible too.

Although the embodiments of FIGS. 2a, 2b, 3a and 3b were described in the context of two touch surfaces connected to a single touch sensor, certain embodiments of the present invention may also be implemented with a different number, e.g. n>2, of touch surfaces connected to a single touch sensor e.g. as described in FIGS. 1a, 1b, 1c and 1d. Use of a different time interval or time constant as discussed in previous embodiments may be applied for more than two sensors. If the resistors differ in their respective resistances by an order of magnitude, the overall system may be broken down into several smaller systems each of which comply with the description of FIGS. 2a and 2b. For example: a system comprising a parasitic capacitor C0, three touch surfaces C1, C2 and C3 and a set of resistors R1, R2 and R3 as implied in one of the options of FIGS. 1a, 1b, 1c and 1d, may have the following parameter values:

R1=20 k12—The resistance between C1 and C2 touch surfaces
R2=200 kΩ—The resistance between C1 and C2 touch surfaces
R3=2000 kΩ—The resistance between C1 and C2 touch surfaces
C0=10 pF—Untouched surface's self capacitance
C1=10 pF—Untouched surface's self capacitance
C2=10 pF—Untouched surface's self capacitance
C3=10 pF—Untouched surface's self capacitance
ΔC=2 pF—Additive capacitance of C1 or C2 due to touch
$I_{M1}$=50 uA—Short time interval measurement (M1) current 'I'.
$I_{M2}$=5 uA—Long time interval measurement (M2) current 'I'
$I_{M2}$=0.5 uA—Long time interval measurement (M2) current 'I'
VCC=4 Volt—Touch Sensor power supply
V_Low_Th=1 Volt—Lower 'V' threshold as depicted in FIG. 12 (FIG. 6 of U.S. Pat. No. 7,797,115)
V_High_Th=3 Volt—Upper 'V' threshold as depicted in FIG. 12 (FIG. 6 of U.S. Pat. No. 7,797,115)
CNT_F=100 MHz—Frequency of CNT clock 602 as depicted in FIG. 12 (FIG. 6 of U.S. Pat. No. 7,797,115).

A system with the above parameters may be approximated by the following two sub-systems a, b:

a. One sub system that uses $IM_1$ and $IN_{12}$ is approximately equivalent to a FIG. 2a compatible-system with the following parameters:

R2'=R1+R2
C1'=C0+C
C2'=C2

It is appreciated that in this sub system, C3 is almost completely masked by its own high resistance.

b. Another sub system that uses $I_{M2}$ and $I_{M3}$ is approximately equivalent to a FIG. 2a compatible system with the following parameters:

R2"=R1+R2+R3
C1"=C0+C1+C2
C2"=C3

From here on, a method similar to that described herein with reference to FIGS. 2a and 2b may be applied, to determine the additive capacitance of each touch surface.

In yet another embodiment of the present invention, a multiplicity of touch sensors may be used to drive a touch panel with multi-touch detection functionality which may be implemented using a single layer of conductive material.

Figure 4A:
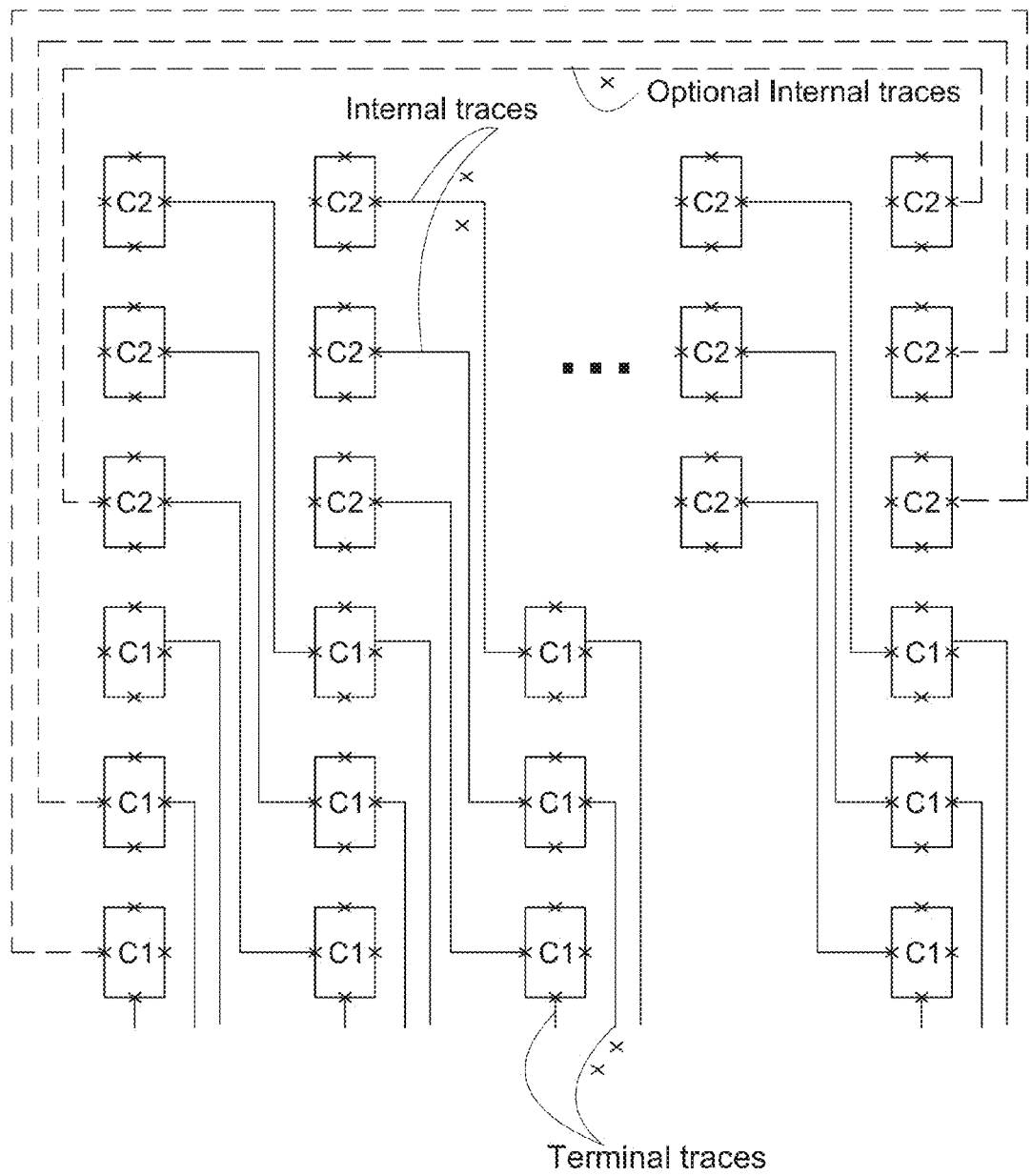
FIGS. 4a, 4c and 4e illustrate configurations at which two touch surfaces are connected to a single touch sensor. This configuration corresponds to the embodiment of FIGS. 2a and 2b as described herein.
Figure 4B:
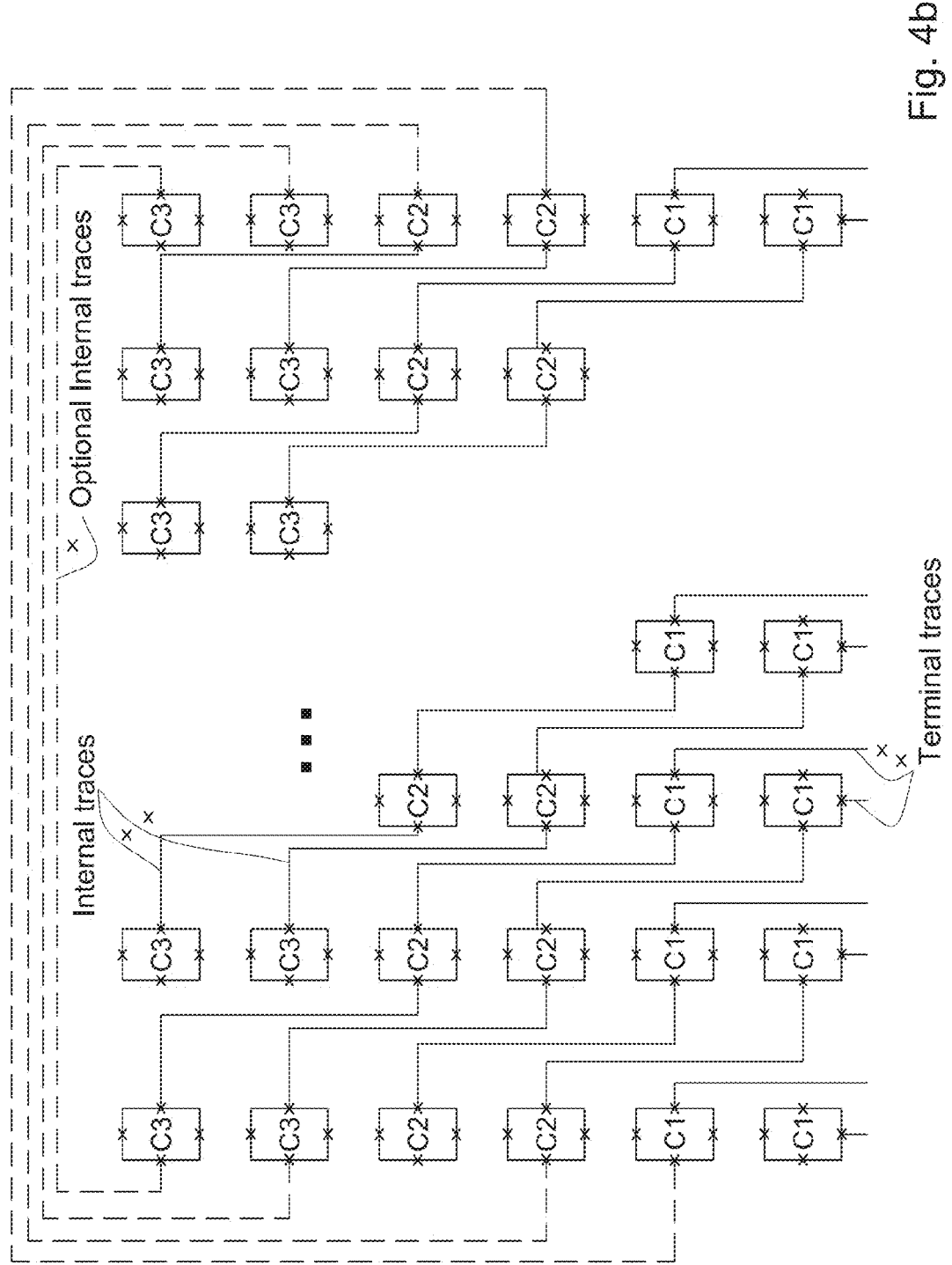
FIGS. 4b, 4d and 4f illustrate configurations at which three touch surfaces are connected to a single touch sensor. This configuration corresponds to the embodiment of FIGS. 1a and 1b as described herein.

FIGS. 4a and 4b are simplified schematic views of touch panels employing certain embodiments of the present invention. In these figures C1, C2 and C3 represent the touch surfaces as generally depicted in FIG. 1a. Each C1 touch surface is connected via a terminal trace to a corresponding touch sensor (not shown). The corresponding C1 and C2 couples are connected via internal traces with resistance R2 (not shown). The corresponding C2 and C3 couples are connected via internal traces with resistance R3 (not shown). The C2 and C3 sensors in the rightmost column may either be connected directly to a dedicated touch sensor via terminal traces (not shown) or may be connected to the corresponding C1 and C2 sensors in the leftmost column via the optional internal traces.

Figure 4C:
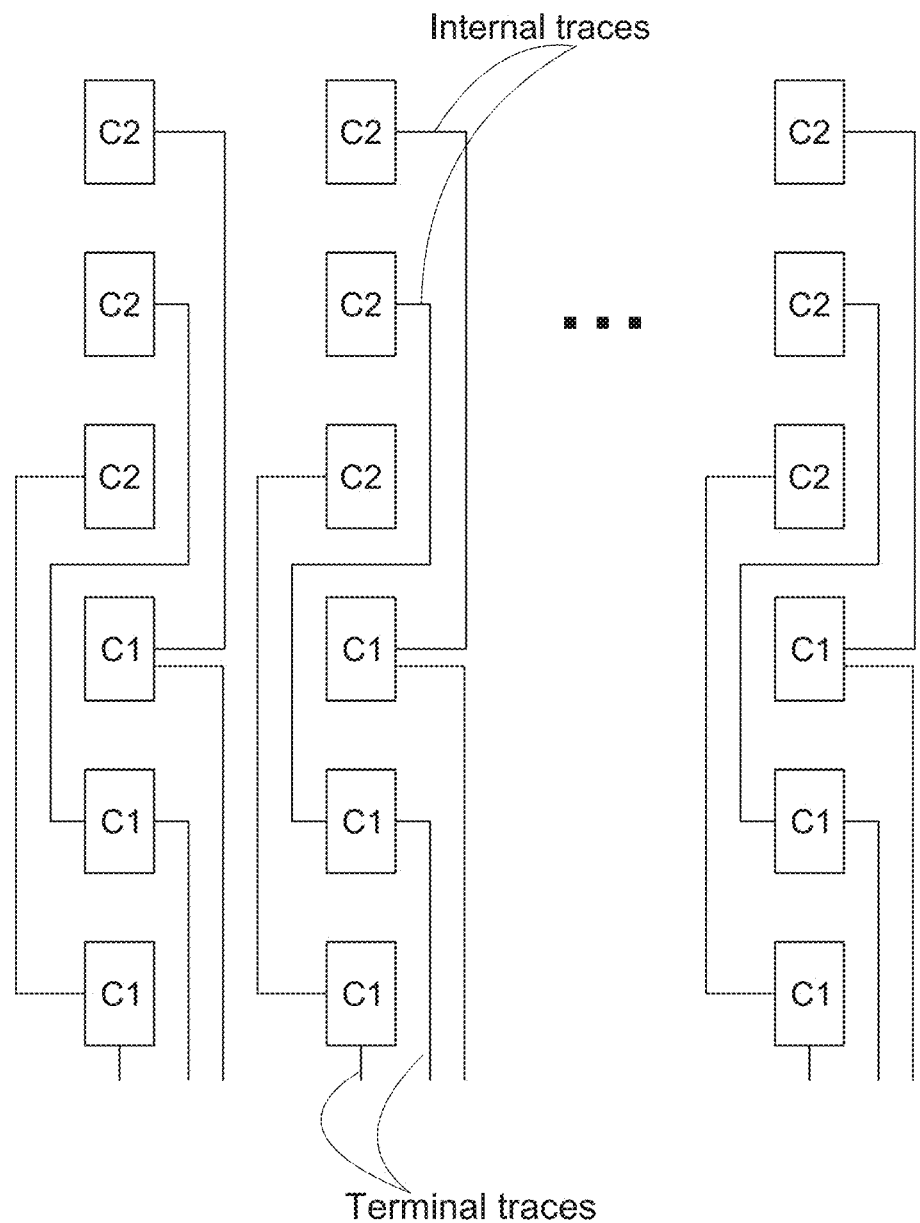
Figure 4D:
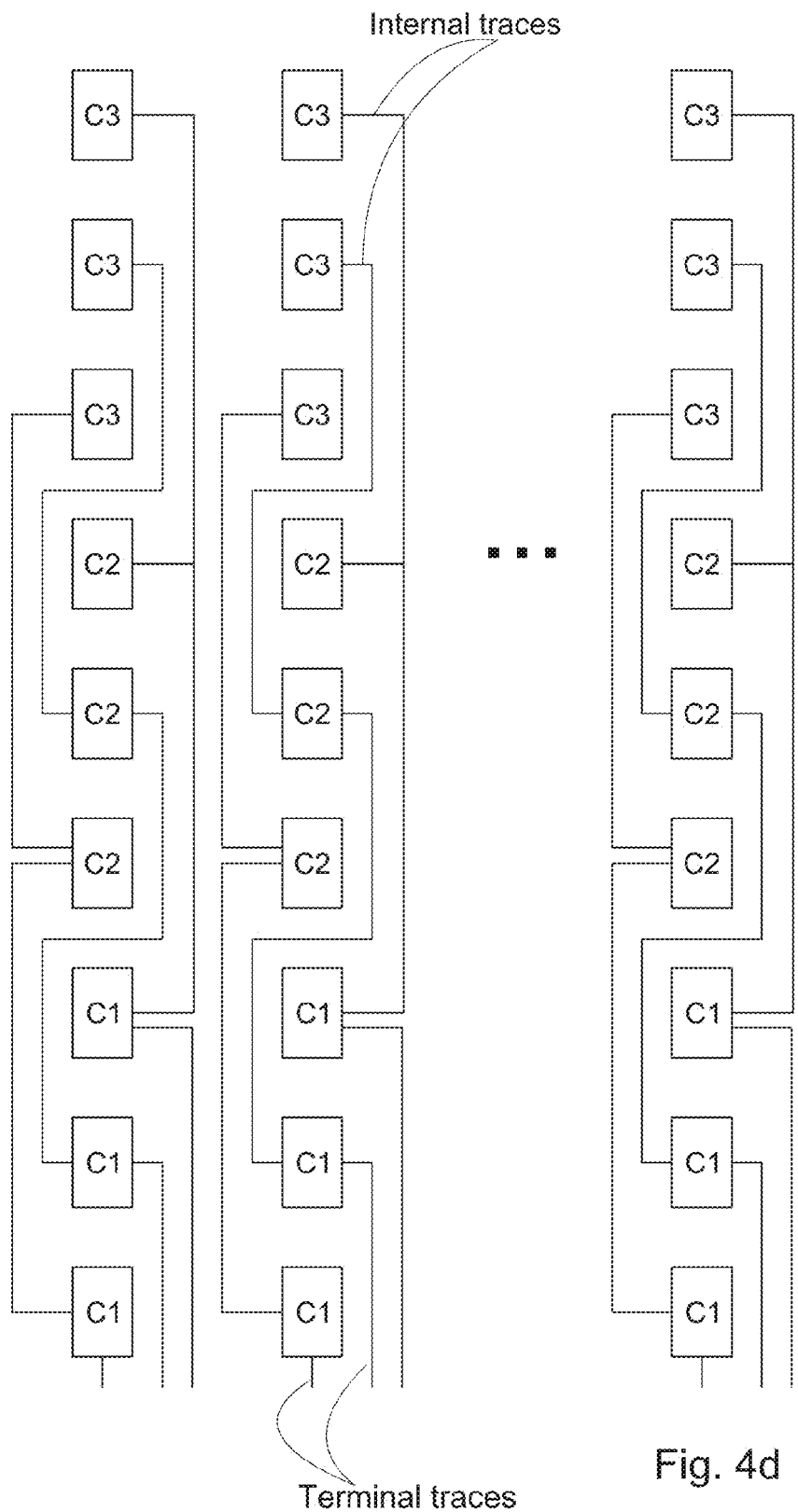
Figure 4E:
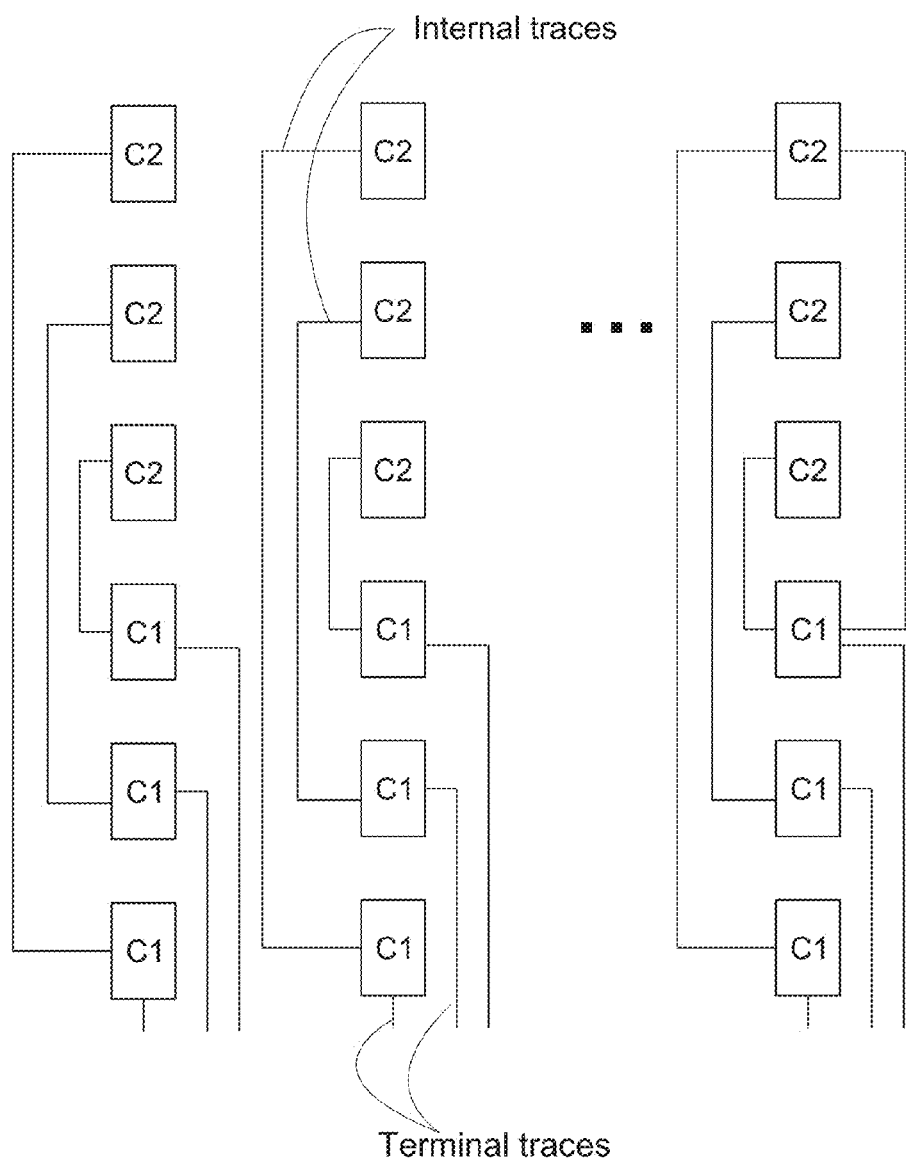

FIGS. 4a, 4c and 4e illustrate configurations at which two touch surfaces are connected to a single touch sensor. This configuration corresponds to the embodiment of FIGS. 2a and 2b as described herein.

Figure 4F:
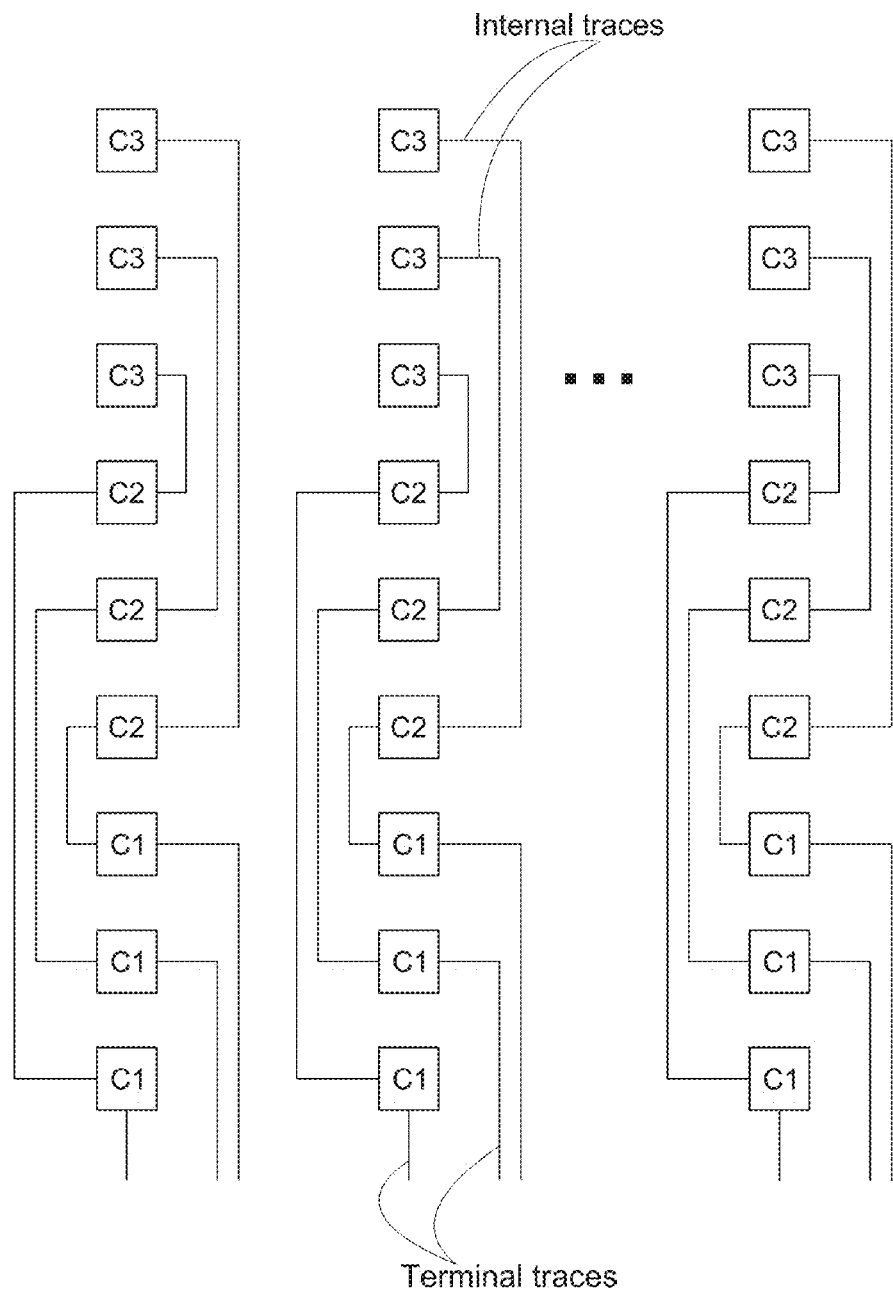

FIGS. 4b, 4d and 4f illustrate configurations at which three touch surfaces are connected to a single touch sensor. This configuration corresponds to the embodiment of FIGS. 1a and 1b as described herein.

The table of FIG. 4g summarizes some of the attributes of the touch panel layout configurations depicted in FIGS. 4a-4f.

A touch panel may take the form, for example, of a touchscreen or a touch pad. A touch pad is typically disposed on a Printed Circuit Board (PCB), in which case a touch pad may be implemented using one metal layer wiring as depicted in FIGS. 4a and 4b. As PCB wires typically have low resistance, additional resistors may be employed to implement R2 and R3 resistances.

Other touch panels may be implemented using a material with non negligible resistance. A typical capacitive touchscreen may be implemented using a transparent conductive material, for example, Indium Tin Oxide (ITO) which has a typical sheet resistance $R_S$ of about 100~800 Ω/square (in order of magnitude). Therefore, the traces' resistance $R_{TRACE}$ may be controlled by setting their width and length according to the following formula (Equation XV):

$$R_{TRACE} = \frac{\text{trace length}}{\text{trace width}} * R_S$$

Such $R_{TRACE}$ may be used, for example, to implement R2 and R3 resistances.

Note that although in FIGS. 4a-4f all terminal traces are routed to one side of the panel, certain embodiments of the present invention is not so limited, for example, a vertically flipped version of each of the abovementioned drawings may be placed right above the original drawing to create a touch panel twice as high which has both top and bottom terminals. This may be desired to reduce the number of parallel traces between touch surfaces columns, the overall trace area and the terminal traces resistance.

Figure 5A:
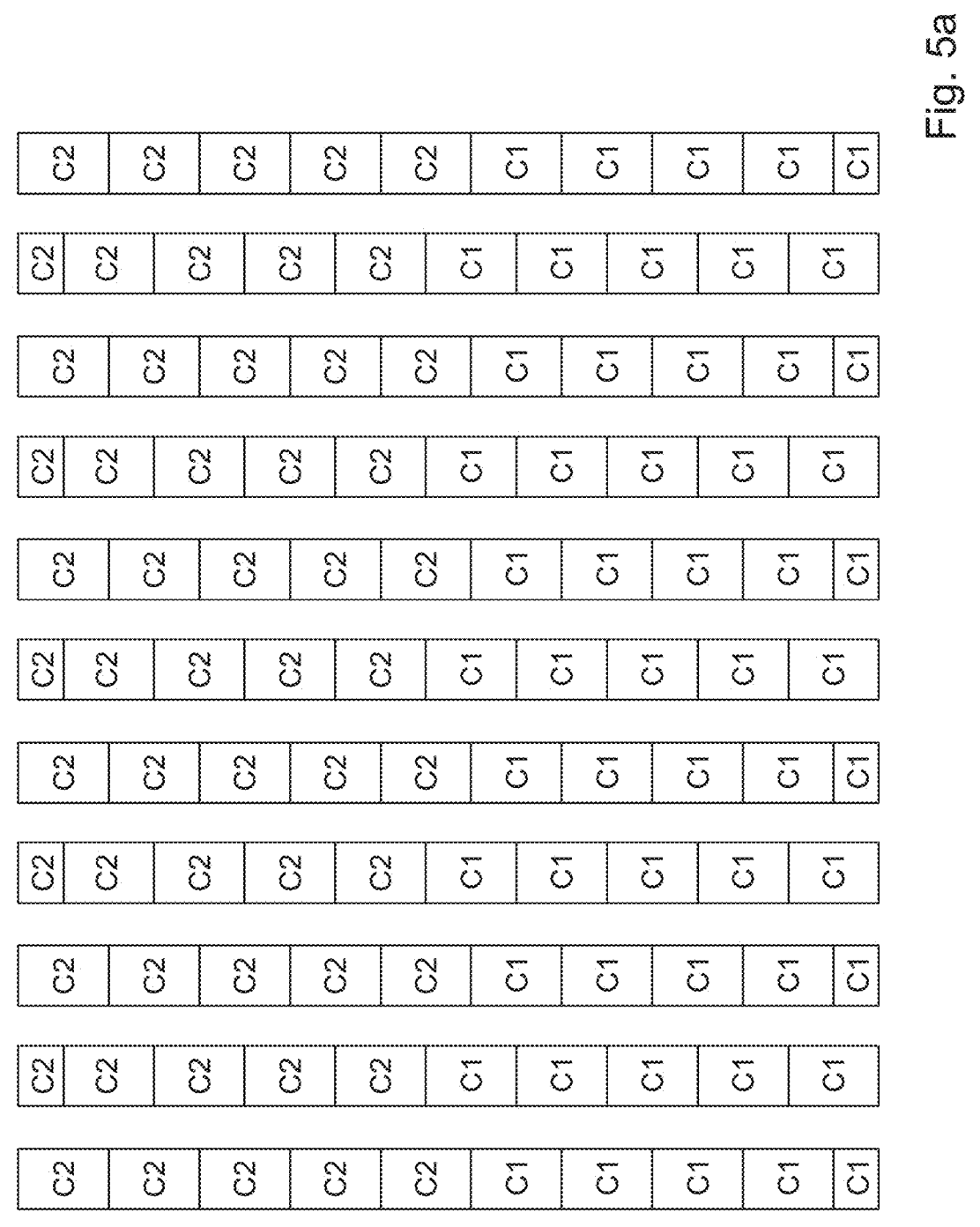

FIG. 5a is a simplified top view of a touch panel layout comprising eleven touch surfaces columns with ten touch surfaces in each column. The connections between the touch surfaces and the touch sensors may be in accordance with FIG. 4a and the description thereof. When there is an even number of surfaces, the number of sensors employed to drive a touch panel with similar configuration may be computed according to the following formula:

{Number of touch sensors}={Number of columns}*{Touch surfaces per column}/2

A total number of 55 touch sensors may be employed to drive the touch panel of FIG. 5a when the connections between the touch surfaces and the touch sensors are in accordance with FIG. 4a. The touch surfaces and traces are shaped from a single layer of conductive material with non-negligible sheet resistance, disposed on an isolating substrate. In the case of a touchscreen, the conductive material may be for example ITO and the shaping of the traces and surfaces may be effected, for example, by lithography, laser etching or wet etching. FIG. 5a may represent an active area of a touchscreen.

Figure 5B:
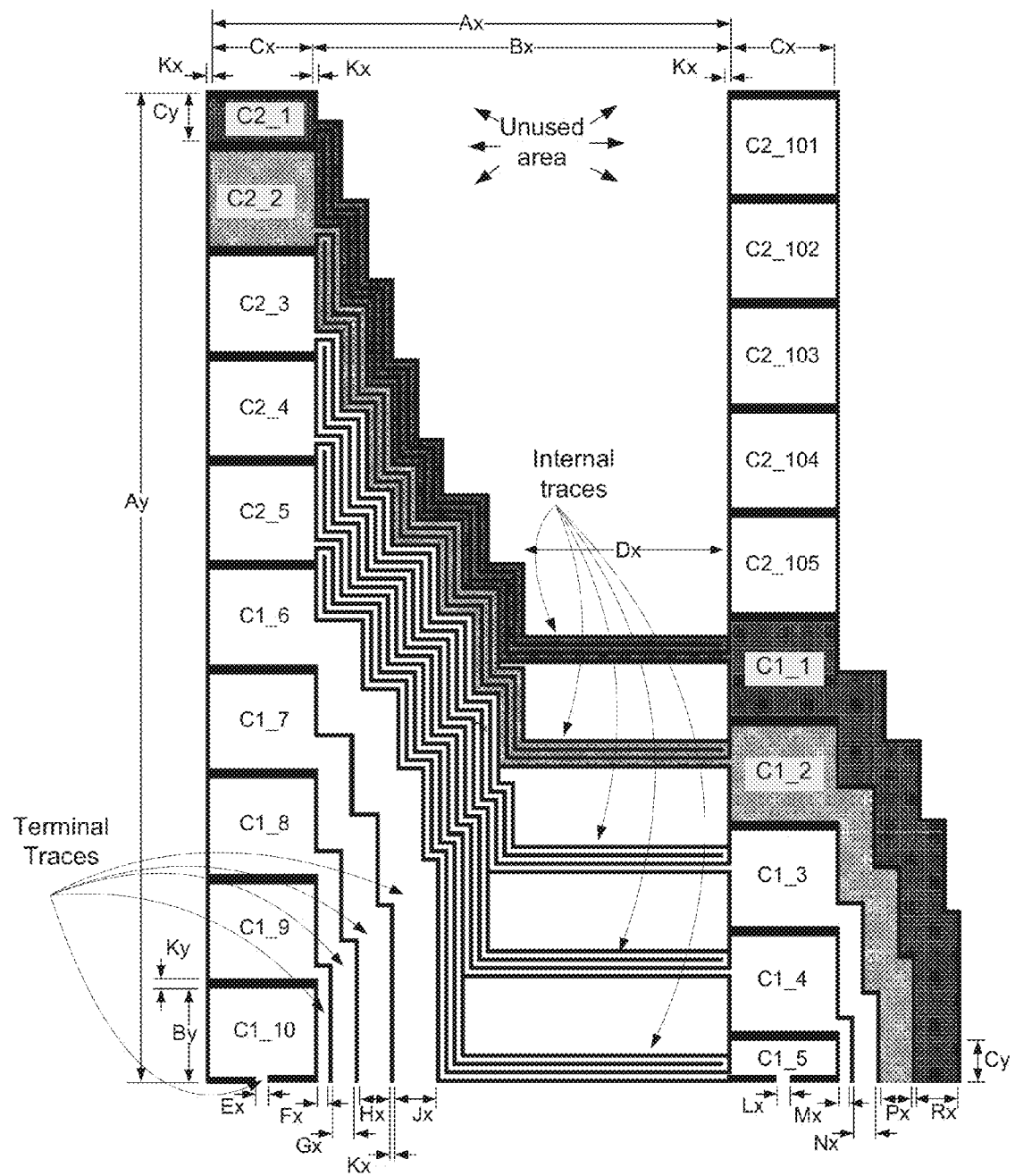

FIG. 5b may be one exemplary zoom-in view of two columns from the touch panel described in FIG. 5a. In FIG. 5b, each C1 and C2 surface is uniquely captioned hence may be specifically referred to. The C1 and C2 notation still refer to the general touch surface case as in other figures, meaning that C1 refers to the touch surface with the lower serial resistance among the two surfaces and C2 refers to the touch surface with the higher resistance.

The conductive material is referred to herein as ITO and is represented in FIG. 5b as the white or patterned areas. The patterned areas refer to the patterns that fill C1_1, C1_2, C2_1, C2_2 surfaces and their corresponding traces. The patterned areas were only set for better visibility of the drawing. The solid black lines represent the isolating cuts that were done to shape the touch surfaces and traces on the ITO layer. The minimum possible cut width and the minimum possible trace width are typically determined by the touch panel manufacturer. For this example, the minimum trace width is set to 40 um and all cut widths are set to 40 um. In touchscreens, a thin cut line of about 40 um or less may be used, otherwise the touchscreen cut patterns may be seen by a naked eye. The terminal traces in this example are all routed to the bottom of the touch panel active area. From there, the terminal traces may be further routed to flexible panel terminals, chip terminals or other. In FIG. 5b, the ITO sheet resistance is assumed to be 150 Ω/square and as can be seen, the internal traces, connecting C1 and C2, follow a snake path, i.e. routing path, deliberately made longer than the shortest route which covers the distance between the connection points in accordance with a certain pattern e.g. a resistance-reducing pattern. The internal traces' patterning in FIG. 5b extends from C1 to C2 and back and forth three times, as for example, between C1_1 to C2_1. That enables the R2 resistance which is able to yield or accurate additive capacitance ΔC detection to be provided.

Under different constraints of minimum trace width and sheet resistance, the snake path could have been partly or entirely eliminated.

In such embodiments, there may be unused ITO areas e.g. areas which are not part of the traces and touch surfaces. As an example, one such area is marked 'unused area' in FIG. 5b. The unused ITO areas may be connected to ground or may be divided into small portions using isolating cut lines which may be aligned with touch surfaces boundaries and applied on the perimeter and/or within the touch panel active area.

Although only one example internal trace pattern is illustrated, there are of course various options for creating a snake path using the area between the touch surfaces columns, around C2 touch surfaces (e.g. in a snail-shell like pattern) or even outside the active area of the touchscreen. For example, In FIG. 5b, the upper spacing area between the two touch surfaces columns is not exploited for the snake paths. This area may be used for routing designed to reduce Bx, which in turn, increases the touch surfaces' width Cx, while maintaining the same column pitch Ax. In order to satisfy a low enough resistance for the terminal traces, the terminal traces connected to the far C1 touch surfaces may be wider than the terminal traces connected to the C1 touch surfaces close by.

FIG. 5b is not to scale. One possible scaling is defined by the following parameters: and
Ax=5 mm—Column pitch
Bx=1.24 mm—Estimated spacing between columns
Cx=3.76 mm—Touch surface width
Dx=0 mm—Redundant area, made for better visibility of the drawing
Ex=40 um—C1_10 terminal trace width
Fx=40 um—C1_9 terminal trace width
Gx=60 um—C1_8 terminal trace width
Hx=90 um—C1_7 terminal trace width
Jx=120 um—C1_6 terminal trace width
Kx=40 um—Isolating cut line width—all over the drawing
Lx=40 um—C1_5 terminal trace width
Mx=40 um—C1_4 terminal trace width
Nx=45 um—C1_3 terminal trace width
Px=75 um—C1_2 terminal trace width
Rx=105 um—C1_1 terminal trace width
Ay=95 mm—total touch panel height
By=10 mm—Full touch surface height pitch
Cy=5 mm—Full touch surface height pitch
Ky=40 um—Isolating cut line width—all over the drawing.

It is appreciated from FIG. 5b and the description thereof that the resulting resistance R1 is about 50 kΩ whereas the resulting R2 resistance is about 500 kΩ. Therefore, the method described in FIGS. 3a and 3b embodiment for touch detection may be applied to detect touch on each touch surface of the touch panel described in FIGS. 5a and 5b.

Parameter combinations differing from the above may be suitable as well. For example, smaller Cx and Cy values may be beneficial for more accurate touch coordinate detection, especially of small objects, typically at the price of employing more touch surfaces to cover the touch panel. Larger Cx and Cy values may be used in cases where touch accuracy is less important. Also, wider terminal traces may be utilized to reduce the resistance between C1 and their corresponding touch sensors, although this may adversely effect Bx which is recommended to be kept small.

Although the capacitances of the touch surfaces C1 and C2, and the additive capacitance due to touch, ΔC, may vary from one system to another, and although the traces have their own capacitance, using appropriate combinations of drive currents and voltage thresholds may yield a wide range of capacitances.

In at least some of the drawings, touch surfaces were depicted as rectangles. However more generally, the touch surfaces may have any suitable shape e.g. quadrilaterals other than rectangles, or non-quadrilateral shapes such as shapes with 3 or more than 4 sides or such as ovals or circles. In case of a touch panel, detection algorithms may be applied to the additive capacitance ΔC readings to resolve the locations of one or more touch objects. Examples of touch object location detection methods, for various touch surfaces shapes and touch panel layouts may be found in published US Patent Application No. 20120262419 a1 of U.S. Ser. No. 13/533,618, entitled "Layouts for detecting multiple touch points in surface-capacitance type touch panels, and methods for providing and using such".

Many systems which comprise touch surfaces may benefit from certain embodiments of the present invention e.g. for reducing the number of required controller pins and logic. Such systems include, but are not limited to, capacitive buttons, track point, touch panel, touch pad (track pad), rows and columns based self capacitive touchscreen, capacitive sliders, capacitive rollers and the like.

The invention is intended to include any suitable Touch panel layout, not necessarily the specific examples shown above, which support a single touch sensor capable of sensing touch on more than one touch surface. Included therefore in the scope of the invention are touch panel (typically touchscreens) 'modules' whose characteristics e.g. resistance, Touch panel dimensions, Touch sensing method, manufacturing process parameters, e.g. minimal trace width and minimal cut width allow several touch surfaces to be distinguished from one another. One advantage of this embodiment is facilitation of multi-touch detection using a single layer ITO.

Other examples of suitable Touch panel layouts which support a single touch sensor capable of sensing touch on more than one touch surface, may include those illustrated in FIG. 6.

The example of FIG. 6 and variations thereupon may differ from FIGS. 4a-4f e.g. in any or all of the following senses:
  The touch surfaces' columns are arranged in horizontally interleaved couples.
  The C2 traces pass right to the bottom and are merged with C1 at the touch panel perimeter, on the FPC or on PCB, if applicable.
  C2 traces may pass through the zigzag area between the interleaved columns or between two non interleaved columns
  The resulting schematic model corresponds to FIGS. 1c-1d, such that the same equations may be used to resolve the circuits.
  Because of the horizontal interleaving, the surfaces may be made wider, and therefore less touch surfaces may be employed to cover a touch panel in this embodiment; and therefore, less touch sensors may be employed to drive the touch panel.

Figure 7A:
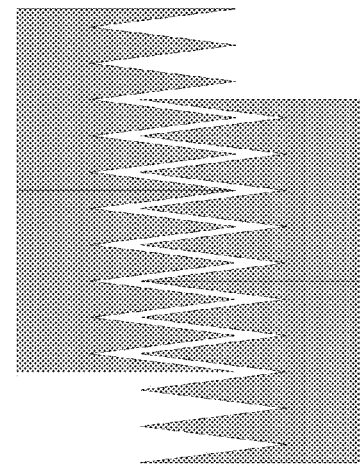
FIGS. 7a-7c illustrate other touch surfaces that may be similarly used, referred to respectively as 'crowns', 'fingers' and 'combs'.
Figure 7B:
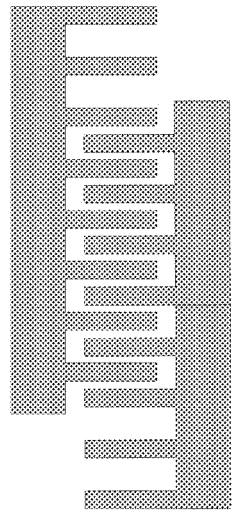
Figure 7C:
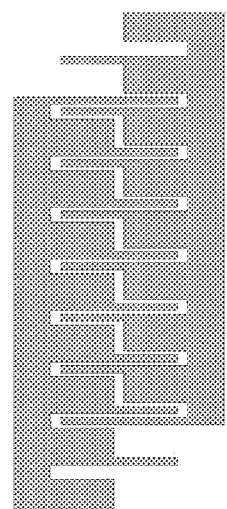

FIGS. 7a-7c illustrate other touch surfaces that may be similarly used, referred to respectively as 'crowns', 'fingers' and 'combs'.

Figure 8:
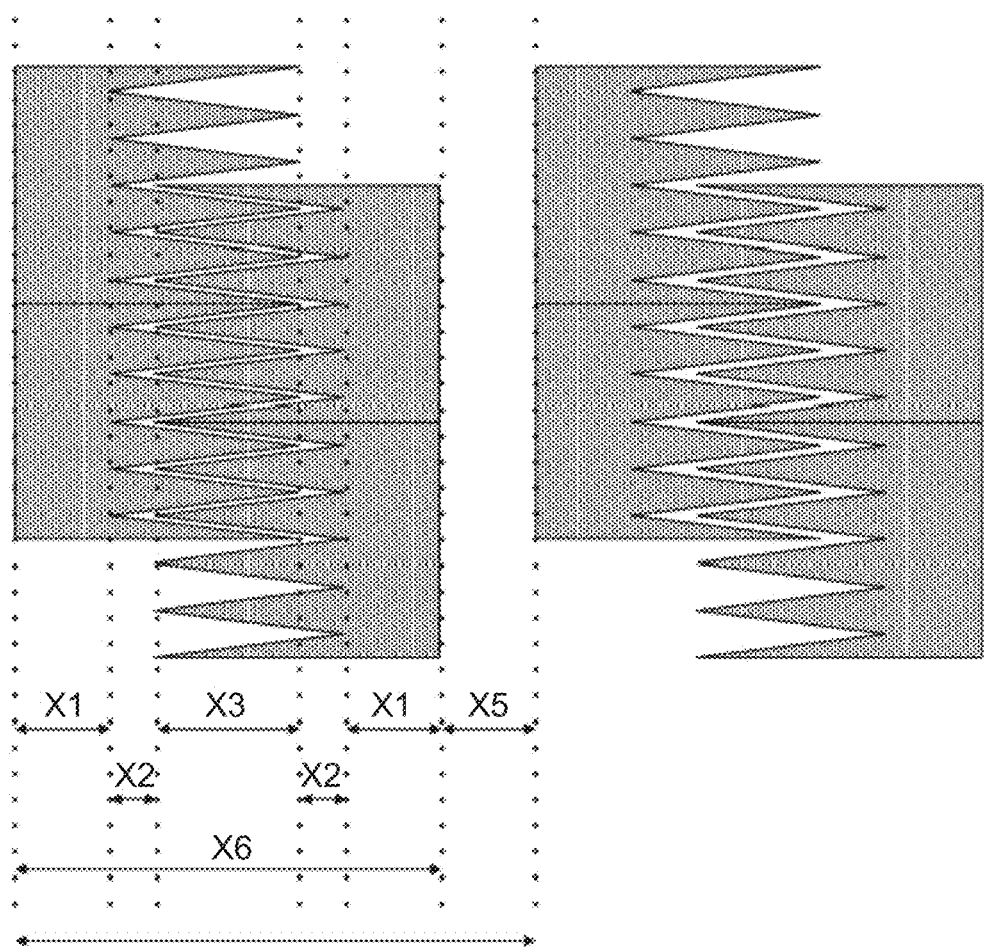
FIG. 8 illustrates a numerical example of touch surface dimensions for the 'crowns' shaped touch surface

FIG. 8 illustrates a numerical example of touch surface dimensions for the 'crowns' shaped touch surface, where:
X1=4—Width of the solid part of the each left and right column
X2=0—cut width between the touch surfaces
X3=5.5—The interleaved area between the columns
X4=13.5—The width of the two interleaved columns
X5=1.5—estimated total trace width
X6=15—Two columns pitch.

In the above example, both C1 and C2 traces pass at X5 spacing. X5 may change per line cut width and number of touch surfaces per column. The corresponding C1 and C2 couples are connected together outside the active area of the touch panel, e.g. on the panel perimeter, FPC, PCB or the like.

Any of the capacitance sensing methods (e.g. Charge Transfer, Successive Approximation, Sigma-Delta, and Mutual Capacitance Measurement described in the Seguine article mentioned in the Background section herein, or such as the Tasher patent's time interval measurement method, may be used in conjunction with certain embodiments of the present invention. The following are examples for how embodiments of the present invention may be implemented using e.g. combining any of the above methods (using, in the examples below, two touch surfaces per sensor)

In all below examples, it is assumed that two surfaces are connected to a single sensor, one via greater resistance and the other via lesser resistance. These sensors may be regarded as equivalent to Csensor in FIGS. 2 and 4 of the Seguine article.

Referring generally to Charge transfer methods, the short measurement involves limiting the time "a sensor capacitor is connected to a voltage source, accumulating charge on that sensor capacitor" "In the first of two non-overlapping phases". Typically, the "sensor capacitor" in the Seguine article is analogous to the two surfaces with different resistances as described herein. The short measurement may be effected such that the surface with the small resistance is affected by the voltage source at the time of the first phase. In the long measurement, in contrast, enough time is allowed to elapse, in the first phase, for the voltage on the two surfaces to stabilize (to a level approximately equal to that of the voltage source). In particular, referring to FIG. 2 of Seguine, the short measurement may be implemented by having 'SW1' closed (in short-circuit state) for a period of time short enough such that the surface with the high resistance does not have enough time to respond to the voltage change due to VDD connection. In this case, VDD connection to Csensor is the measurement stimulus.

The long measurement may be implemented by having 'SW1' of Seguine's FIG. 2 closed (in short-circuit state) for a period of time long enough to ensure that both surfaces have enough time to respond If calibration factors (k coefficients e.g.) are not to be used, C1, C2, R1 and R2 should be such that when effecting the short measurement, the effect of a delta C2 value on the short measurement results is small enough to fall within system SNR requirements. When the method is applied on capacitive buttons, such requirements may relate to the min delta capacitance to be recognized as touch, and the maximal capacitance that is not to be recognized as touch. For example, assume a touch surface topology in which two (first and second) capacitive buttons (touch surfaces), are connected to a single touch sensor according to FIG. 1a, where: Only the Touch Sensor, C0, C1, C2, R1 and R2 are implemented; C0 and R1 represent parasitic capacitance and resistance of the circuit respectively; C1 represents the first button with the lower resistance to the touch sensor; C2 represents the second button with the higher resistance to the touch sensor; and R2 represents the additional resistance of the second button over the first resistor.

T_M1 is the time that elapses from M1 measurement initiation (i.e. when measurement stimulus is applied on the touch surfaces) until the measurement result is sampled. For example, in the 'Tasher patent, U.S. Pat. No. 7,797,115, T_M1 refers to the time interval bounded by time-points 614 and 618 of FIG. 6. In the charge transfer example of FIG. 2 in the Seguine article, T_M1 refers to the time that the SW1 switch is closed. T_M2 is the same as T_M1, but for M2.

Also:
$C2/2 < C0+C1 < C2*2$
$R1 < R2/10$ $$T\_M1 < \frac{R2*(C0+C1)*C2}{(C0+C1+C2)*4},$$

which condition is analogous to the condition that justifies equation (II) herein where C1 in equation (II) is equivalent to (C1+C0) above.

$$T\_M2 > \frac{R2*(C0+C1)*C2*2}{(C0+C1+C2)} + T\_M1,$$

which condition is analogous to the condition that justifies equation (III) herein where C1 in equation (III) is equivalent to (C0+C1) above.

Controlling T_M1 and T_M2 in the Tasher patent, U.S. Pat. No. 7,797,115, may be achieved by setting ΔV and I per equations (II) and (III) respectively. It is appreciated that a multiplicity of such buttons arranged in a similar topology may be used to form a touch panel.

Also, additional buttons may be connected similarly, for example, referring (again) to FIG. 1b, a third button modeled by C3 with additive resistance R3 over C2 may be added to the abovementioned topology along with additional measurement with time constant T_M3, where:

T_M3 is the same as T_M1, but for M3
$C3/2 < C0+C1 < C3*2$
$R2 < R3/10$ $$T\_M2 < \frac{R3*(C0+C1+C2)*C3}{(C0+C1+C2+C3)*4}$$

In addition to the above T_M2 condition. This condition is analogous to the condition that justifies equation (II) herein where C1 in equation (II) is equivalent to (C0+C1+C2) above.

$$T\_M3 > \frac{R2*(C0+C1+C2)*C3*2}{(C0+C1+C2+C3)} + T\_M2$$

FIG. 9 is a simplified flow diagram for sensing touch on discrete touch buttons such as typically used, for example, in cellular phones, tablets and other electronic devices. The flow of FIG. 9 typically comprises some or all of the following steps, suitably ordered e.g. as shown:

Step 10: Connect touch sensor to 2 or more touch surfaces each with different resistance Step 20: optionally, calibrate to find correction factors (K-coefficients) which may be used as weight factors contributing to delta-capacitance estimates Step 30: Effect short measurement e.g. M1 when touch surfaces are not being touched and record results as reference Step 35: Effect long measurement e.g. M2 when touch surfaces are not being touched and record results as reference Step 40: To determine if touch has or has not occurred at a given moment, the method of FIG. 11 may be employed.

Step 50a: Compute recovered additive capacitance of one surface (ΔC1") using difference level computed in step 240c, for example, as described in equation (X)

Step 50b: Compute recovered additive capacitance of another surface ($\Delta C2''$) using difference level computed in step 240d, for example, as described in equation (XI). Re steps 50a, 50b—if steps 51a, 51b are omitted, this is equivalent to K11=1; K12=0 in which case the recovered additive capacitance of the first touch surface is the additive capacitance measured by the short time constant measurement ($\Delta CM1$) and that of the second touch surface is the difference between the value of the long time constant measurements minus the short time constant measurements ($\Delta CM2-\Delta CM1$):

$$\Delta C1''=\Delta CM1$$

$$\Delta C2''=\Delta CM2-\Delta CM1$$

Step 51a: optionally, improve recovered additive capacitances computed in step 50a using K values and plug into equation X Step 51b: optionally, improve recovered additive capacitances computed in step 50b using K values and plug into equation XI Step 80: return "touch" for $1^{st}$ surface if recovered additive capacitance computed in step 50a or 51a exceeds a threshold.

Step 90: return "touch" for $2^{nd}$ surface if recovered additive capacitance computed in step 50b or 51b exceeds a threshold.

Regarding the sequence of steps 10, 30, 240a and 240c, one may use a capacitance sensor connected to at least $1^{st}$ & $2^{nd}$ touch surfaces to measure current I over a short time interval achieved using a 1st drive current and/or $1^{st}$ voltage range, e.g. by positioning same capacitance sensor such that the resistance between the sensor and each of the touch surfaces is significantly different, and conducting a measurement, over an interval short enough to provide an estimate of the capacitance of only the touch surface with the lower resistance.

Regarding the sequence of steps 10, 35, 240b and 240d, one may use a capacitance sensor connected to at least $1^{st}$ & $2^{nd}$ touch surfaces to measure current I over long time interval achieved by using a second drive current less than the $1^{st}$ drive current and/or a $2^{nd}$ voltage smaller than the $1^{st}$ voltage range, e.g. by positioning same capacitance sensor such that the resistance between the sensor and each of the surfaces is significantly different, and conducting a measurement over an interval long enough to provide an estimate of the total capacitance of at least both of the $1^{st}$ and $2^{nd}$ touch surfaces.

Regarding the sequence of steps 30-240d, it is appreciated that FIG. 6 of U.S. Pat. No. 7,797,115 describes just one possible method among other known methods, for converting raw measurements into capacitance values.

Regarding step 50a, one may estimate delta-capacitance over the $1^{st}$ touch surface which is directly connected to a capacitance sensor or is connected to the sensor with lower resistance, relative to at least one other touch surface connected to the same sensor with higher resistance.

Regarding step 50b, one may estimate delta-capacitance in the $2^{nd}$ touch surface by computing difference between total delta-capacitance over both surfaces (step 240b) and delta-capacitance in $1^{st}$ surface (step 240a).

Regarding step 51A, one may improve estimated delta-capacitance over $1^{st}$ touch surface (step 50a) by using correction factors (K-coefficients) computed during calibration process 5 to weight the delta-capacitance in $1^{st}$ surface e.g. using formula X.

Regarding step 51b, one may improve estimated delta-capacitance over $2^{nd}$ touch surface (step 50b) by using correction factors (K-coefficients) computed during calibration process 5 to weight total delta-capacitance over both surfaces (from step 30) vs delta-capacitance in $1^{st}$ surface (from step 40) e.g. using formula XI.

Generally, steps 10-50 measure capacitance in 2 or more surfaces using a single sensor. The resulting capacitance values may then be converted into:

a. Yes/no touched button indication, e.g. using the method of FIG. 9 as described above; or into b. touch-location within screen, using the method of FIG. 10 as described herein.

Figure 10:
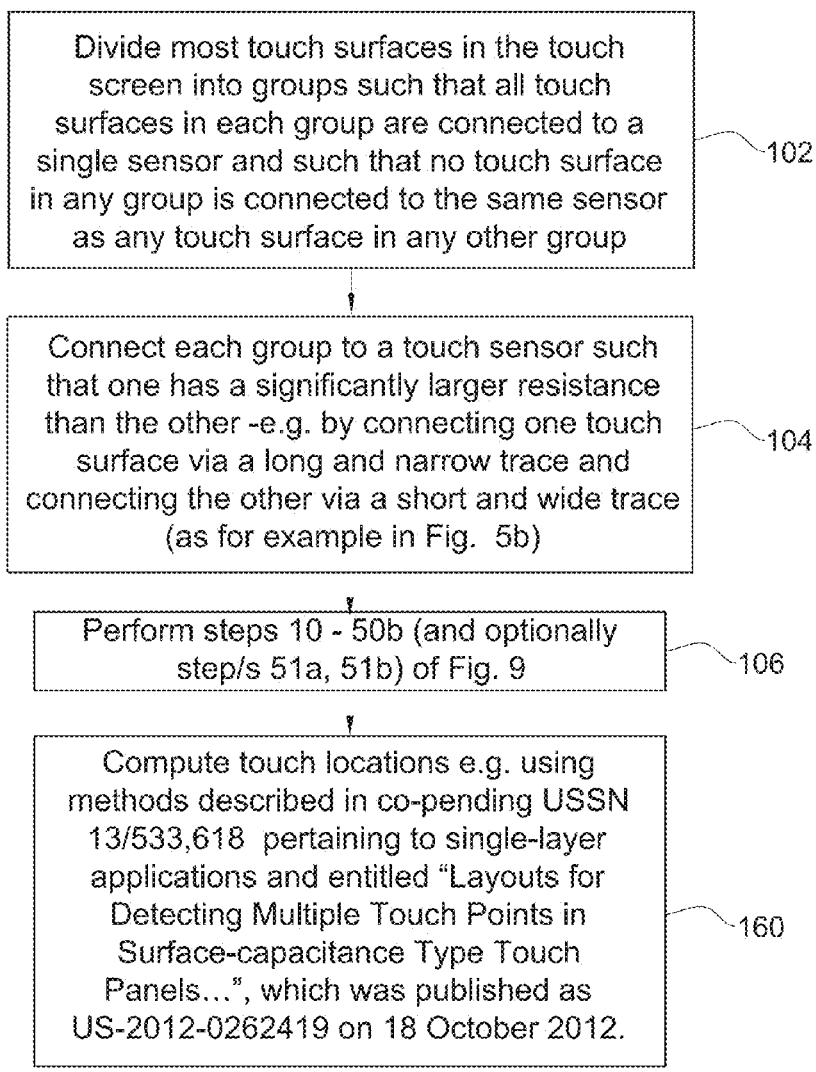
FIG. 10 is a simplified flow diagram of a process for sensing touch on a touch-screen which lacks touch buttons and which reports touch coordinates rather than a discrete touch/no-touch report (per button); the process may comprise some or all of the illustrated steps, suitably ordered e.g. as shown.

FIG. 10, then, is a simplified flow diagram for sensing touch on a touch-screen which lacks touch buttons and which reports touch coordinates rather than a discrete touch/no-touch report (per button). The flow of FIG. 10 typically comprises some or all of the following steps, suitably ordered e.g. as shown:

Step 102: Divide most touch surfaces in the touch screen into groups such that all touch surfaces in each group are connected to a single sensor and such that no touch surface in any group is connected to the same sensor as any touch surface in any other group.

Step 104: Connect each group to a touch sensor such that one has a significantly larger resistance than the other—e.g. by connecting one touch surface via a long and narrow trace and connecting the other touch surface via a short and wide trace (as for example in FIG. 5b)

Step 106: Perform steps 10-50b (and optionally step/s 51a, 51b) of FIG. 9.

Step 160: Compute touch locations e.g. using methods described in co-pending U.S. Ser. No. 13/533,618 pertaining to single-layer applications and entitled "Layouts for Detecting Multiple Touch Points in Surface-capacitance Type Touch Panels . . . ", which was published as US-2012-0262419 on 18 Oct. 2012.

Figure 11:
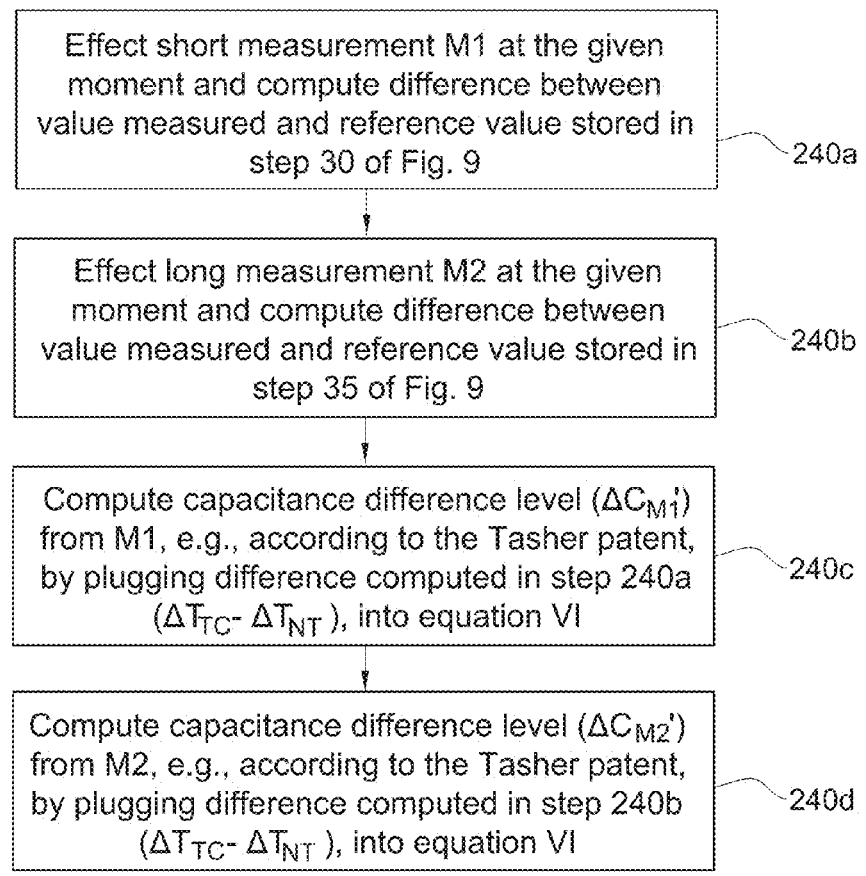
FIG. 11 is a simplified flow diagram of an example method for performing step 40 of FIG. 9; the method may comprise some or all of the illustrated steps, suitably ordered e.g. as shown.

FIG. 11 is a simplified flow diagram of an example method for performing step 40 of FIG. 9. The flow of FIG. 11 typically comprises some or all of the following steps, suitably ordered e.g. as shown:

Step 240a: Effect short measurement M1 at the given moment and compute difference between value measured and reference value stored in step 30 of FIG. 9

Step 240b: Effect long measurement M2 at the given moment and compute difference between value measured and reference value stored in step 35 of FIG. 9

Step 240c: Compute capacitance difference level ($\Delta C_{M1}'$) from M1, e.g., according to the Tasher patent, by plugging difference computed in step 240a ($\Delta T_{TC}-\Delta T_{NT}$), into equation VI Step 240d: Compute capacitance difference level ($\Delta C_{M2}'$) from M2, e.g., according to the Tasher patent, by plugging difference computed in step 240b ($\Delta T_{TC}-\Delta T_{NT}$), into equation VI Regarding steps 240a-240d in FIG. 11, any or all of the following methods (i)-(iv) may be employed for capacitance determination:

(i) using Time Interval measurement e.g. as per U.S. Pat. No. 7,797,115 to Tasher, as input to a method for deriving capacitance from current e.g. as described in Tasher at FIG. 6.

(ii) A touch sensor may use a cyclic voltage or current source for stimulating circuits similar to those described in the above embodiments and drawings. Such a source may output a sinusoidal wave, square wave, triangular wave a chainsaw wave or other. In this case, the computational model is slightly different from the one described in FIGS. 2a, 2b, 3a and 3b, but a similar detection method may be applied. Varying the frequency and the drive strength may be used to differentiate between the measurements so for M1 a higher source frequency, a higher drive strength or both may be applied relative to M2. The resistances may be tuned differently to achieve capacitance detection with minimum error, or (iii) (charge transfer method) a touch sensor may use charge transfer stimulation method for stimulating circuits similar to those described in the above embodiments and drawings. Such a touch sensor typically discharges a previously charged reference capacitor and compares the network voltage after the discharge to a baseline. Using a serial resistor between the touch sensor and the touch surfaces may slow the stabilization time and give time to measure the transition effect which is employed for the multiple touch surfaces detection. Or:

(iv). A combination of measurement methods (i) or (ii) or (iii).

It is appreciated that whereas in touch button applications, the touch threshold is typically compared against only one touch sureface, in buttonless touchscreen applications, the touch threshold may be compared against plural touch surfaces. If the touchscreen comprises a single layer touchscreen all sensors and touch surfaces are typically routed in a single conductive layer to save cost.

The terms "Short measurement" or "fast measurement" or "short interval measurement" or "measure current I over short time interval" and the like all relate to a measurement effected over an interval or "measurement interval" such that, from among the multiple touch surfaces served by the capacitance sensor, only the touch surface (resistor-capacitor circuit) having the lower or lowest RC (Resistance*Capacitance) time constant is able to respond during the measurement interval (e.g. only change in that touch surface's capacitance substantially affects the measurement result). In the presently disclosed subject matter, since the capacitances of both or all touch surfaces being served by the sensor are of the same order of magnitude, the differentiating factors in their RC time constants is the resistance between each of them and the capacitance sensor.

The terms "long measurement" or "slow measurement" or "long interval measurement" or "measure current I over long time interval" and the like all relate to a measurement effected over an interval or "measurement interval" such that all circuit components (touch surfaces served by a single sensor) may effectively respond during the measurement interval.

Medium time interval measurement relates to a measurement which is effected such that more than one, but less than all, circuit components (=touch surfaces served by a single sensor) may effectively respond during the measurement interval.

A particular advantage of certain embodiments is that each touch sensor takes up space and adds to cost of production and contributes to fail rates. By providing a single touch alert generator, serving more than one touch surface, space is conserved and/or cost of production and/or fail rates are reduced.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof may also be provided as methods and steps therewithin, and functionalities described or illustrated as methods and steps therewithin may also be provided as systems and sub-units thereof. The scale used to illustrate various elements in the drawings is merely exemplary and/or appropriate for clarity of presentation and is not intended to be limiting.

The invention claimed is:

1. A touch sensing system comprising:
a set of touch surfaces in a touch panel including a population of touch surfaces; and
at least one touch alert generator operative for separately alerting for touch on each of, and both of, at least first and second touch surfaces from among the population of touch surfaces,
wherein said alert generator is operative to determine capacitance of said first touch surface, to determine touch object capacitance of said first and second touch surfaces, and to compute a difference between the two capacitances, thereby to generate an approximation for touch object capacitance of said second touch surface, and
wherein said first and second touch surfaces are connected to said single touch alert generator via a first electrical resistance of at least zero ohm, and via a second electrical resistance higher than said first electrical resistance, respectively.

2. A system according to claim 1 wherein said alert generator is operative to determine capacitance of said first touch surface when touched, determine touch object capacitance of said first and second touch surfaces when touched, and compute a difference between the two capacitances, thereby to generate an approximation for touch object capacitance of said second touch surface when touched.

3. A system according to claim 2 wherein said alert generator is operative to improve the approximation for touch object capacitance of said second touch surface using at least one pre-calibrated coefficient k to improve approximation of touch object capacitance of said second touch surface when not touched.

4. A system according to claim 3 wherein said at least one pre-calibrated coefficient k is extracted from at least one of a circuit model and calibration measurements.

5. A system according to claim 3 wherein said at least one pre-calibrated coefficient k comprises at least one linear correction factor per touch surface for long capacitance measurement and same for short capacitance measurement.

6. A system according to claim 2 wherein said touch surfaces served by the touch alert generator also comprise a third touch surface and wherein said touch alert generator is also operative to determine touch object capacitance of said first, second and third touch surfaces, and to compute a difference between the touch object capacitance of said first, second and third touch surfaces, and the capacitance of said first and second touch surfaces, thereby to generate an approximation for touch object capacitance of said third touch surface.

7. A system according to claim 2 wherein said alert generator is operative to improve the approximation for touch object capacitance of said second touch surface using at least one pre-calibrated coefficient k to improve approximation of difference between capacitance of at least one touch surface when touched and when not touched.

8. A system according to claim 1 wherein the resistances between the touch alert generator and each of the surfaces connected thereto differ by at least one order of magnitude.

9. A system according to claim 1 wherein said touch surfaces are formed from a single layer of material disposed on an insulating surface covering a touch panel area.

10. A system according to claim 1 wherein at least one of said resistances are at least partly provided by a trace connecting at least one touch surface to the touch alert generator.

11. A system according to claim 10 wherein the set of touch surfaces defines a touch panel active area and wherein at least one trace electrically connecting between at least one touch surface and said touch alert generator is disposed inside the touch panel active area.

12. A system according to claim 10 wherein said touch surface-touch alert generator trace comprises a transparent conductor.

13. A system according to claim 10 wherein the set of touch surfaces comprises an array, having a vertical length, of touch surfaces arranged in rows and columns and wherein crossing between traces is prevented, thereby to facilitate construction of a single-layer touch panel, in that,
or at least some sets of at least two touch surfaces each served by, and connected in series to, a single touch alert generator:
each of said sets include at least a first touch surface in a first row and a second touch surface in a row adjacent to the first row.

14. A system according to claim 13 wherein said second touch surface's vertical distance from the first touch surface is less than two-thirds of said vertical length, thereby to reduce interference between touch surfaces.

15. A system according to claim 14 wherein resistance between each of said touch surfaces and the touch alert generator, differs from resistance between each other touch surface and the touch alert generator, by at least an order of magnitude.

16. A system according to claim 10 wherein difference in resistance between first and second touch surfaces connected via trace to, and served by, a single touch alert generator, is provided by providing first and second traces, to said first and second touch surfaces respectively, which differ in length.

17. A system according to claim 10 wherein difference in resistance between first and second touch surfaces connected via trace to, and served by, a single touch alert generator, is provided by providing traces to said first and second touch surfaces which differ in width.

18. A system according to claim 10 wherein for at least some pairs of first and second touch surfaces each served by, and connected in series to, a single touch alert generator, resistance between the touch alert generator and the first touch surface, which is further from the single touch alert generator, is at least twice the resistance between the touch alert generator and the second touch surface which is closer to the single touch alert generator.

19. A system according to claim 1 wherein resistance between each of said touch surfaces and the touch alert generator, differs from resistance between each other touch surface and the touch alert generator, by at least a factor of 2.

20. A system according to claim 19 wherein said second trace doubles back on itself at least once.

21. A system according to claim 1 wherein said touch alert generator is controlled to determine capacitance over different time intervals, so as to invoke participation of different subsets of said touch surfaces, including a first determination of capacitance in which only the first touch surface, connected via the first electrical resistance which is relatively low, participates and a second determination, conducted over a longer time period than the first determination, in which at least said at least first and second touch surfaces both participate.

22. A system according to claim 21 wherein said touch surfaces served by the touch alert generator also comprise a third touch surface and wherein said touch alert generator is controlled to effect a third determination of capacitance, conducted over a longer time period than said second determination, in which said first, second and third touch surfaces all participate, and wherein in said second determination, only said at least first and second touch surfaces participate.

23. A system according to claim 1 wherein said alert generator is operative to determine capacitance by time interval measurement and wherein different currents are used for different touch surfaces.

24. A system according to claim 1 wherein said alert generator is operative to determine capacitance by a charge transfer technique.

25. A touch sensing method comprising:
providing a set of touch surfaces in a touch panel including a population of touch surfaces; and
providing at least one touch alert generator separately alerting for touch on each of, and both of, at least first and second touch surfaces from among the population of touch surfaces,
wherein said alert generator is operative to determine capacitance of said first touch surface, to determine touch object capacitance of said first and second touch surfaces, and to compute a difference between the two capacitances, thereby to generate an approximation for touch object capacitance of said second touch surface, and
wherein said first and second touch surfaces are connected to said single touch alert generator via a first electrical resistance of at least zero ohm, and via a second electrical resistance higher than said first electrical resistance, respectively.

26. A method according to claim 25 wherein the touch panel includes a touch panel area and wherein the touch surfaces are formed from a single layer of material deposited on an insulating surface covering the touch panel area.

* * * * *